United States Patent
Oishi et al.

(10) Patent No.: US 6,880,167 B2
(45) Date of Patent: Apr. 12, 2005

(54) DISK CARTRIDGE FOR ENGAGING WITH A SENSOR MEMBER OF A DRIVE DEVICE

(75) Inventors: Kengo Oishi, Kanagawa (JP); Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 126 days.

(21) Appl. No.: 10/096,670

(22) Filed: Mar. 14, 2002

(65) Prior Publication Data

US 2002/0131196 A1 Sep. 19, 2002

(30) Foreign Application Priority Data

Mar. 15, 2001 (JP) ........................................ 2001-073821

(51) Int. Cl.[7] .............................................. G11B 23/03
(52) U.S. Cl. ...................................................... 720/725
(58) Field of Search ................................ 720/725, 728, 720/730–731; 369/291; 360/133, 99.02–99.03, 99.06–99.07, 99.05, 99.12, 98.08

(56) References Cited

U.S. PATENT DOCUMENTS

| | | | | | |
|---|---|---|---|---|---|
| 5,481,420 A | * | 1/1996 | Cardona et al. | ......... | 360/99.06 |
| 5,583,710 A | * | 12/1996 | Nicklos et al. | ............... | 360/71 |
| 5,694,278 A | * | 12/1997 | Sumner | ...................... | 360/133 |
| 5,974,026 A | * | 10/1999 | Guerini | ...................... | 369/291 |
| 6,011,773 A | * | 1/2000 | Guerini et al. | ............... | 369/291 |
| 6,178,067 B1 | * | 1/2001 | Schick et al. | ............... | 360/133 |
| 6,226,150 B1 | * | 5/2001 | Nguyen | ...................... | 360/133 |
| 6,473,392 B2 | * | 10/2002 | Shiomi et al. | ............... | 369/291 |
| 6,556,373 B1 | * | 4/2003 | Mamiya et al. | .......... | 360/99.02 |
| 6,614,622 B2 | * | 9/2003 | Kikuchi et al. | ............. | 360/133 |
| 6,721,266 B1 | * | 4/2004 | Kobayashi et al. | ......... | 720/738 |
| 6,735,154 B2 | * | 5/2004 | Nowell | .................... | 369/30.36 |
| 6,754,167 B1 | * | 6/2004 | Nakashima | ................. | 369/291 |

FOREIGN PATENT DOCUMENTS

| | | |
|---|---|---|
| JP | 11-312353 | 11/1999 |
| JP | 2000-30394 | 1/2000 |
| JP | 2000-30395 | 1/2000 |
| JP | 2000-30396 | 1/2000 |
| JP | 2000-30397 | 1/2000 |
| JP | 2000-30398 | 1/2000 |
| JP | 2000-30399 | 1/2000 |
| JP | 2000-90626 | 3/2000 |
| JP | 2000-90627 | 3/2000 |
| JP | 2000-90628 | 3/2000 |

\* cited by examiner

Primary Examiner—Angel Castro
(74) Attorney, Agent, or Firm—Sughrue Mion, PLLC

(57) ABSTRACT

The present invention relates to a disk cartridge, which can be accurately positioned with respect to a drive device for accessing a disk medium. The disk cartridge provided with a case rotatably accommodating a disk medium therein, an arcuate side wall which is directed forward when the case is loaded into the drive device, and a shutter member formed on at least one surface of the case, for opening or closing an opening for access to the disk medium. An engaging portion is provided at a side wall to engage with a sensor member disposed in the drive device for accessing the disk medium so as to record or reproduce information thereon.

11 Claims, 21 Drawing Sheets

FIG.5
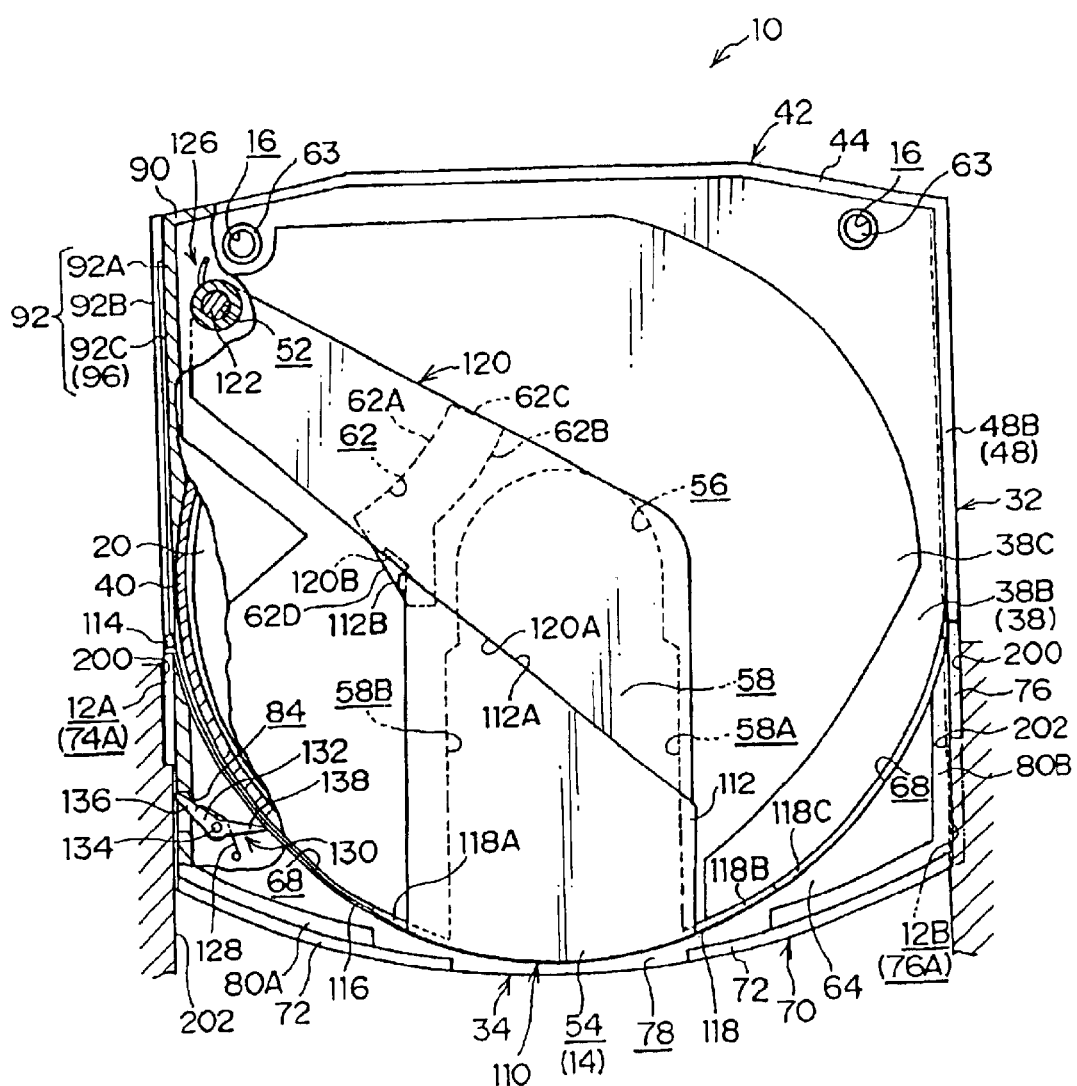
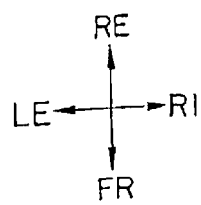

FIG.8A
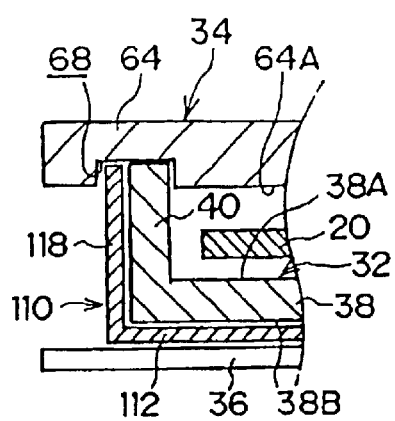 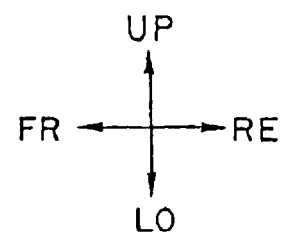
FIG.8B
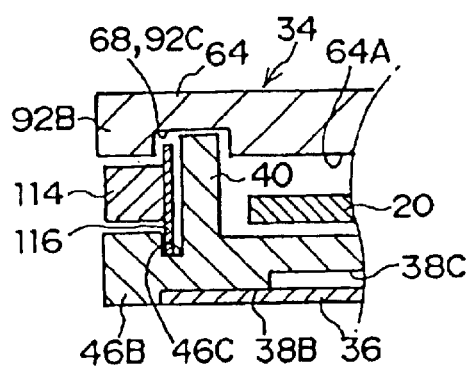 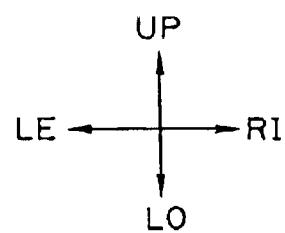

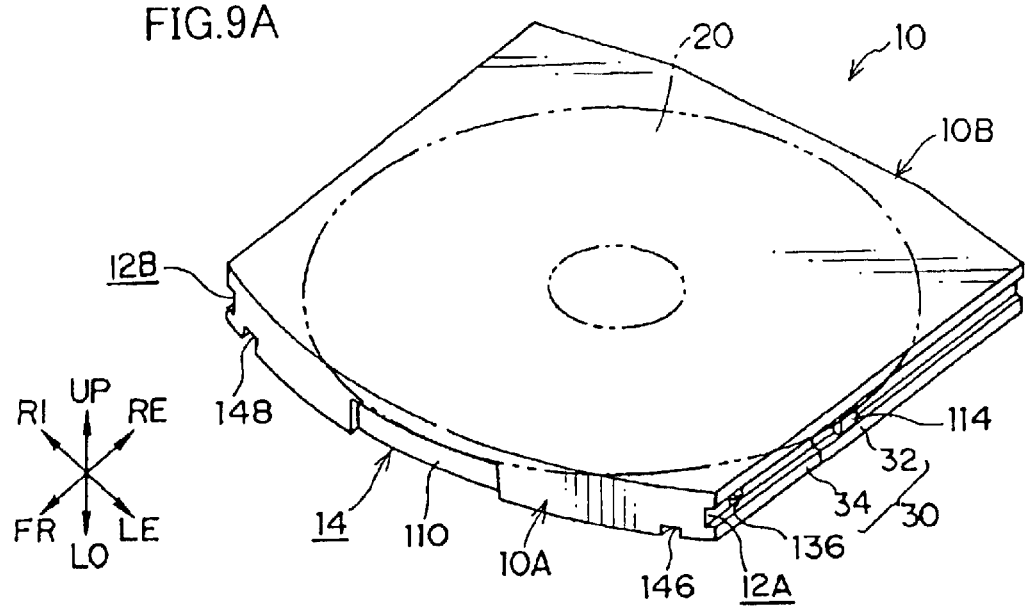
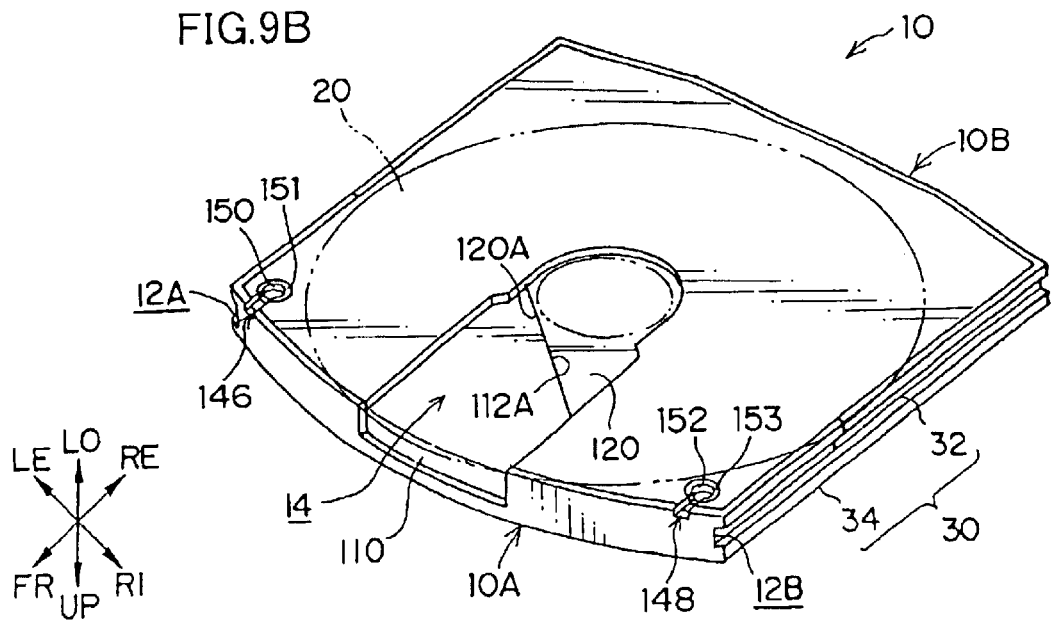

DISK CARTRIDGE FOR ENGAGING WITH A SENSOR MEMBER OF A DRIVE DEVICE

BACKGROUND OF THE INVENTION

1. Field of the Invention

The present invention relates to a disk cartridge in which a disk medium to be used as a recording/reproducing medium for information processing or the like is rotatably accommodated while preventing any intrusion of dust or the like.

2. Description of the Related Art

There has been conventionally used a disk medium such as an optical disk or a magneto-optical disk as a recording/reproducing medium for a portable computer. In such a disk medium, information is recorded by forming a pit, changing a phase or magnetizing, caused by decomposition of a pigment layer on a recording side by irradiating the recording side with a laser beam while the disk medium is rotated in the state in which it is loaded in a drive device. Moreover, such a disk medium is designed to reproduce the information recorded according to a reflectance ratio or a difference in polarizing angle of a laser beam.

Furthermore, in such a disk medium, there has been conventionally proposed to shorten a wavelength of the laser beam for irradiating the recording side so as to increase a recording capacity. In the case where the information is recorded or reproduced by using the laser beam having a short wavelength (for example, a violet laser beam), it is necessary to reduce the thickness of a cover layer, which protects the recording side of the disk medium, in order to suppress attenuation of the laser. However, if the thickness of the cover layer is reduced, the surface of the cover layer, i.e., an aperture of the laser beam at a surface exposed to the outside becomes smaller, and an influence of dust or the like adhering to the surface of the cover surface cannot be disregarded.

Therefore, there has been used a disk cartridge in which a disk medium is accommodated in a case, to prevent any adhesion of dust or the like to the disk medium. Such a disk cartridge comprises an opening for allowing a part of a center hole (i.e., a center core) formed at the center portion of the disk medium and a part of a recording side (i.e., a cover layer) to be exposed to the outside, and a shutter member for opening/closing the opening.

In the disk cartridge, the opening is normally shut by the shutter member so as to prevent of dust or the like intruding inside the disk cartridge, that is, so as to prevent any adhesion of dust or the like to the disk medium. When the disk cartridge is loaded in the drive device, the opening is opened, and the center hole (i.e., the center core) can be held by a rotary spindle and a laser head can approach to the recording side (namely, can irradiate the recording side with the laser beam).

In the disk cartridge of this type, miniaturization and thinning are desired while it is necessary to secure a space for accommodating the shutter member therein in the state in which the opening is opened. Japanese Patent Application Laid-open (JP-A) No. 2000-30394 discloses a disk cartridge in which miniaturization and thinning are achieved by dividing a shutter member into two parts.

The disk cartridge disclosed in the above-described Application is configured in such a manner as to shut the entire opening in the state in which the end of a first shutter member, which mainly shuts an opening portion for inserting a laser head thereinto (i.e., for allowing a laser head to approach), abuts against the end of a second shutter member, which mainly shuts an opening portion for inserting a rotary spindle thereinto. These first and second shutter members are pivoted in different directions while the mutual abutting ends are separated from each other in the state in which the opening is opened, so that both of the shutter members can be accommodated inside a accommodating space substantially equivalent to projected area of a disk medium. Consequently, it is possible to prevent any adhesion of dust or the like to the disk medium, and further, to reduce the size and thickness of the disk cartridge.

A case for rotatably accommodating the disk medium therein is formed by, for example, joining an upper shell and a lower shell to each other, in which an opening for an access to the disk medium is formed at the lower shell. The shutter member for opening/closing the opening is movably accommodated between a covering-plate having a similar opening formed thereat and the lower shell. Namely, an actuating member for opening or closing the shutter member is disposed on one of side walls of the disk cartridge. When the disk medium is loaded in a drive device, the actuating member abuts against an unlock member disposed in the drive device, and thus, is pressed relatively backward, so that the shutter member is moved (i.e., pivoted), thereby opening the opening.

In the disk cartridge with the above-described configuration, the disk medium is loaded in the drive device, so that the center core portion of the disk medium is held in the rotary spindle in the drive device. Therefore, it is necessary to set the center core with respect to the rotary spindle accurately. Thus, positioning the disk cartridge in the drive device is a very important matter.

In the disk cartridge as disclosed in the above-described Application, for example, reference holes are formed at right and left corners at the lower surface backward in the direction in which the disk cartridge is loaded in the drive device. When positioning members of the drive device are inserted into the reference holes, the disk cartridge can be positioned in the drive device. Conventionally, a sensor member of a contact type is disposed at the lower surface of a disk cartridge inserting port in the drive device, and the front side wall of the disk cartridge is brought into contact with the sensor member, so as to actuate the above-described positioning members. The contact of the front side wall of the disk cartridge in this way is intended to actuate the positioning members initially.

As shown in FIG. 21, in such a manner as to recognize the direction to insert the disk cartridge into the drive device from the external appearance, for example, the disk cartridge of this type may have its front side wall, which is first inserted into the drive device, formed in an arcuate shape in plan view, which is a different shape from other side walls. However, when the front side wall of the disk cartridge is formed into an arcuate shape, a deficiency such as inaccurate contact with a sensor member 206 or 208 (in this case, a sensor member 206) in the drive device when the disk cartridge is inserted into the drive device may easily occur. Therefore, the drive device and the disk cartridge may not be able to be uniquely positioned, thereby arising a problem that the center core cannot be accurately set with respect to the rotary spindle.

Furthermore, the lateral width of the disk cartridge is set slightly smaller than that of the disk cartridge inserting port formed at the drive device in such a manner that the disk cartridge can be smoothly loaded in the drive device.

Therefore, the disk cartridge is designed to be loaded in the drive device with a slight space kept with respect to the disk cartridge inserting port. Consequently, the positional accuracy of the disk cartridge with respect to the drive device is liable to become unstable, resulting in difficulty in securing the positional accuracy of the disk cartridge with respect to the rotary spindle or the laser head.

Moreover, in the case when the size of the actuating member for opening/closing the shutter member of the disk cartridge is small, there may be a risk that deficiencies such as the actuating member fails to contact an unlock member in the drive device occur. If the actuating member fails to contact the unlock member, there occurs a trouble that the opening cannot be opened. Additionally, since dimensional errors generated in molding each of a plurality of members (for example, an upper shell, a lower shell, a covering-plate and the like) are compounded up in the disk cartridge configured by assembling the members, it has been conventionally difficult to enhance dimensional accuracy, in particular, in the entire height (thickness) of the disk cartridge.

SUMMARY OF THE INVENTION

An object of the present invention is to provide a disk cartridge which can favorably engage with a sensor member in a drive device even if the front side wall of the disk cartridge to be loaded in a drive device is formed into an arcuate shape, so as to enhance positional accuracy of an actuating member for opening or closing a shutter member with respect to an unlock member, and further, to provide a disk cartridge enhancing dimensional accuracy in a height direction so as to accurately position the disk cartridge with respect to the drive device.

A disk cartridge according to a first aspect of the present invention accommodates a disk medium and is loaded into a drive device that accesses the disk medium to record or reproduce information thereon, the disk cartridge comprising: a case for rotatably accommodating the disk medium, the case including an arcuate side wall that is initially inserted into the drive device and having an opening in at least one surface thereof to enable access of the disk medium; an engaging portion for engaging with a sensor member of the drive device, the engaging portion being disposed at the side wall; and a shutter member for opening the opening when the disk cartridge is inserted and for closing the opening when the disk cartridge is removed from the drive device.

With this disk cartridge, when the disk cartridge is inserted into a drive device, a sensor member in the drive device engages with an engaging portion, thereby uniquely determining the position of the disk cartridge with respect to the drive device. Consequently, even if the side wall which faces forward when the disk cartridge is loaded in the drive device is formed into an arcuate shape, a center core of a disk medium can be always set with high accuracy with respect to a spindle in the drive device.

Preferably, the engaging portion comprises a recessed notch that continues from an upper part of the side wall to an upper surface of the case.

With the above-described configuration, even if the side wall, through which the disk cartridge is loaded in the drive device, is formed into an arcuate shape, the sensor member in the drive device can securely and promptly engage with the engaging portion disposed on the side wall. Moreover, the orientation of the insertion of the disk cartridge when the disk cartridge is inserted into the drive device can be readily observed from the outside, thereby further preventing insertion of the drive device from the wrong side.

Preferably, the disk cartridge further comprises a covering-plate including an opening corresponding to the opening of the case, wherein the case comprises an upper shell and a lower shell joined to one another, with the opening of the case being formed in the lower shell, the shutter member is movably accommodated between the covering-plate and the lower shell, and the engaging portion is disposed at the upper shell.

With the above-described configuration, since the upper shell without any opening is high in rigidity, sufficient strength can be secured in the engaging portion. Consequently, the engaging portion can be machined with high accuracy.

A disk cartridge according to a second aspect of the present invention accommodates a disk medium and is loaded into a drive device that accesses the disk medium to record or reproduce information thereon, the disk cartridge comprising: a case for rotatably accommodating the disk medium, the case including an arcuate side wall that is initially inserted into the drive device and an opening in at least one surface thereof to enable access of the disk medium; a positioning portion for engaging with a restricting member of the drive device to position the disk medium, the positioning portion being disposed at the side wall; an operating portion for engaging with a detection member of the drive device to initiate operation of a spindle of the drive device, the operating portion being disposed at the side wall; and a shutter member for opening the opening when the disk cartridge is inserted and for closing the opening when the disk cartridge is removed from the drive device.

With this disk cartridge, when the disk cartridge is inserted into a drive device, a restricting member and a detecting member in the drive device engage with a positioning portion and an operating portion, respectively, thereby uniquely determining the position of the disk cartridge with respect to the drive device. Consequently, even if the side wall, through which the disk cartridge is loaded in the drive device, is formed into an arcuate shape, a center core of a disk medium can be always set with high accuracy with respect to a spindle in the drive device.

Preferably, the disk cartridge further comprises a covering-plate including an opening corresponding to the opening of the case, wherein the case comprises an upper shell and a lower shell joined to one another, with the opening of the case being formed in the lower shell, the shutter member is movably accommodated between the covering-plate and the lower shell, and the operating portion and the positioning portion are disposed at the upper shell.

Preferably, the positioning portion comprises a recessed notch that continues from an upper part of the side wall to an upper surface of the case.

More preferably, the operating portion comprises a recessed notch that continues from an upper part of the side wall to an upper surface of the case.

With the above-described configuration, since the upper shell without any opening is high in rigidity, sufficient strength can be secured in the positioning portion and the operating portion. Consequently, the positioning portion and the operating portion can be machined with high accuracy.

Moreover, even if the side wall, through which the disk cartridge is loaded in the drive device, is formed into the arcuate shape, the restricting member in the drive device can securely and promptly engage with the positioning portion disposed on the side wall. Moreover, the orientation of insertion of the disk cartridge when the disk cartridge is inserted into the drive device can be readily observed from the external appearance, thereby further preventing insertion of the drive device from the wrong side.

Additionally, even if the side wall, through which the disk cartridge is loaded in the drive device, is formed into the arcuate shape, the detecting member in the drive device can securely and promptly engage with the operating portion disposed on the side wall. Moreover, the orientation of the insertion of the disk cartridge when the disk cartridge is inserted into the drive device can be readily observed from the external appearance, thereby further preventing insertion of the drive device from the wrong side.

A disk cartridge according to a third aspect of the present invention accommodates a disk medium and is loaded into a drive device that accesses the disk medium to record or reproduce information thereon, the disk cartridge comprising: a case for rotatably accommodating the disk medium, the case including an opening in at least one surface of the case to enable access of the disk medium; a reference portion for engaging with a positioning member of the drive device, the reference portion being disposed on at least one surface of the case; a guide groove for guiding the disk cartridge to the positioning member when the disk cartridge is inserted into the drive device, the guide groove communicating with the reference portion and being substantially parallel to a direction in which the disk cartridge is inserted; and a shutter member for opening the opening when the disk cartridge is inserted and for closing the opening when the disk cartridge is removed from the drive device.

With this disk cartridge, in the case where a reference portion is formed of, for example, a hole, the disk cartridge can be securely guided by a positioning member in a drive device in engagement with a guide groove, so that the positioning member can be inserted into the hole. Consequently, the disk cartridge can be positioned with respect to the drive device with enhanced accuracy mainly in the longitudinal and lateral directions. Furthermore, the depth of the guide groove can compensate for a projecting height of the positioning member, thereby reducing the thickness of an insertion port in the drive device into which the disk cartridge is inserted.

Preferably, the reference portion includes a hole portion and the number of the reference portion is more than one, and at least one of the hole portions is formed into an elongated hole with a shorter dimension along the direction of insertion.

With this disk cartridge, even if there is a slight dimensional error between the drive device and the disk cartridge when the disk cartridge is loaded in the drive device, the hole having a substantially slot-like shape can compensate for such error, so that the positioning member in the drive device can be securely inserted into the hole with ease.

Further, the guide groove preferably comprises a width substantially the same as a diameter of the hole portion of the reference portion.

With this disk cartridge, the disk cartridge can be favorably guided by the positioning member of the drive device, and further, the positioning member can be preferably inserted into the hole, thereby positioning the disk cartridge with respect to the drive device with high accuracy.

Furthermore, the hole portion preferably includes a depth greater than a depth of the guide groove.

With the above-described configuration, the positioning member of the drive device can be stably inserted, thereby positioning the disk cartridge with respect to the drive device with high accuracy.

More preferably, the disk cartridge further comprises a covering-plate including an opening corresponding to the opening of the case, wherein the case comprises an upper shell and a lower shell joined to one another, with the opening of the case being formed in the lower shell, the shutter member is movably accommodated between the covering-plate and the lower shell, and wherein the upper shell includes a boss protruding therefrom passing through the covering-plate, the reference portions being disposed at the bosses, and the guide groove formed in at least the covering-plate by cutting away a portion of the covering-plate.

With the above-described configuration, since an upper shell without any opening is high in rigidity, sufficient strength can be secured in a reference portion, thereby enhancing the positional accuracy of the disk cartridge with respect to the drive device. Moreover, it is possible to enhance the positional accuracy in the vertical (height) direction. Additionally, since a guide groove can be formed by cutting away a portion of the covering-plate, moldability is good.

A disk cartridge according to a fourth aspect of the present invention comprising: a case formed by joining an upper shell and a lower shell to each other, the case rotatably accommodating the disk medium and including an opening for accessing the disk medium; a shutter member for opening the opening when the disk cartridge is inserted and for closing when the disk cartridge is removed from the drive device, the shutter member being disposed outside the case; a covering-plate movably accommodating the shutter member between the covering-plate and the case, the covering-plate including an opening for accessing the disk medium; and a boss disposed at the upper shell and passing through the covering plate, the boss including a distal end surface usable as a height direction reference surface.

With this disk cartridge, it is possible to enhance the dimensional accuracy of the disk cartridge in a height direction. In other words, since an upper shell without any opening is high in rigidity, the tip surface of a boss disposed at the upper shell is exposed from the covering-plate, so that the tip surface can be used as a reference surface in the height direction of the disk cartridge.

Preferably, the disk cartridge according to the fourth aspect of the present invention, plural bosses are provided at the upper shell and at least one of the bosses is formed to pass through the lower shell.

With the above-described configuration, a lower shell can be assembled with respect to the upper shell in the state in which the lower shell is already substantially positioned at the upper shell, thereby enhancing the assembling accuracy and assembling properties of the disk cartridge, so as to enhance the dimensional accuracy of the disk cartridge.

Further preferably, at least one of the bosses includes a hole portion in which a positioning member of the drive device can be inserted.

With this disk cartridge, when the disk cartridge is loaded in the drive device, the disk cartridge can be positioned with respect to the drive device with high accuracy.

A disk cartridge according to a fifth aspect of the present invention accommodates a disk medium and is loaded into a drive device that accesses the disk medium to record or reproduce information thereon, the disk cartridge comprising: a case for rotatably accommodating the disk medium, the case including an opening in at least one surface thereof to enable access of the disk medium; a plurality of reference portions for positioning the disk cartridge in the drive device, the plurality of reference portions being engageable with a positioning member of the drive device and arranged in a line substantially parallel to a direction in which the disk cartridge is inserted into the drive device and disposed on at least one surface of the case; and a shutter member for opening the opening when the disk cartridge is inserted and for closing the opening when the disk cartridge is removed from the drive device.

With this disk cartridge, the disk cartridge can be favorably positioned with respect to a drive device mainly in the longitudinal and lateral directions, thereby enhancing the positional accuracy.

A disk cartridge according to a sixth aspect of the present invention accommodates a disk medium and is loaded into a drive device that accesses the disk medium to record or reproduce information thereon, the disk cartridge comprising: a case for rotatably accommodating the disk medium, the case including an opening in at least one surface thereof to enable access the disk medium; a guide groove disposed in a side wall of the case; a shutter member for opening and closing the opening; a lock member for locking and unlocking the shutter member; an actuating member disposed movably along the guide groove, so as to abut against the lock member when the disk cartridge is inserted and removed from the drive device for actuating the shutter member to open or close the opening; and a plurality of reference portions for positioning the disk cartridge in the drive device, the plurality of reference portions being arranged substantially parallel to the guide groove and disposed on at least one surface of the case in the vicinity of the guide groove.

With this disk cartridge, the disk cartridge can be positioned with respect to the drive device mainly in the longitudinal and lateral directions with enhanced positional accuracy. Moreover, since a reference portion and an actuating member are disposed near each other, it is possible to enhance the positional accuracy of the actuating member with respect to a lock member disposed in the drive device. Consequently, deficiencies such as the actuating member failing to contact the lock member do not occur.

The disk cartridge according to the sixth aspect of the present invention, the reference portion preferably includes a hole portion and the number of the reference portion is more than one, and at least one of the hole portions of the reference portions is formed into an elongated hole with a shorter dimension along the direction of insertion.

With this disk cartridge, even if there is a slight dimensional error between the drive device and the disk cartridge when the disk cartridge is loaded in the drive device, a positioning member in the drive device can be securely inserted into a hole with ease.

Preferably, the disk cartridge further comprises a covering-plate including an opening corresponding to the opening of the case, wherein the case comprises an upper shell and a lower shell joined to one another, with the opening of the case being formed in the lower shell, the shutter member is movably accommodated between the covering-plate and the lower shell, and wherein the upper shell includes bosses protruding therefrom passing through the covering-plate, and the reference portions being disposed at the bosses.

With the above-described configuration, since an upper shell without any opening is high in rigidity, sufficient strength can be secured in the reference portion, thereby enhancing the positional accuracy of the disk cartridge with respect to the drive device. Moreover, it is possible to enhance the positional accuracy in a vertical (height) direction.

Further preferably, at least one of the bosses is formed to pass through the lower shell.

With this disk cartridge, a lower shell can be assembled with respect to an upper shell in the state in which the lower shell is already substantially positioned at the upper shell, thereby enhancing the assembling accuracy and assembling properties of the disk cartridge, so as to enhance the dimensional accuracy of the disk cartridge.

BRIEF DESCRIPTION OF THE DRAWINGS

FIG. 5 is a view showing the disk cartridge according to the present invention in an unlocked state, similarly to FIG. 4.

FIG. 8A is a cross-sectional view showing the structure of a front end of the disk cartridge according to the present invention.

FIG. 8B is a cross-sectional view showing the structure of a left wall of the disk cartridge according to the present invention.

FIG. 9A is a perspective view showing a disk cartridge according to a second embodiment of the present invention, as viewed slantwise from an upper front side.

FIG. 9B is a perspective view showing the disk cartridge according to the second embodiment of the present invention, as viewed slantwise from a lower front side.

DESCRIPTION OF THE EMBODIMENTS

A disk cartridge 10 in a embodiment according to the present invention will be described in detail in reference to FIGS. 1A to 8B. Here, in FIGS. 1A to 8B, arrows FR, RE, UP, LO, LE and RI indicate forward (i.e., a loading direction), rearward, upward, downward, leftward and rightward of the disk cartridge 10, respectively, as viewed in a direction in which the disk cartridge 10 is loaded in (inserted into) a drive device. Hereinafter, vertical, longitudinal and lateral directions correspond to the directions indicated by the above-described arrows.

In addition, the above-described directions are indicated for the convenience of explanation, and therefore, it should be understood that the directions do not limit the directions when the disk cartridge 10 is in use. Consequently, the disk cartridge 10 may be, for example, horizontally or vertically arranged when it is in use.

Figure 1A:
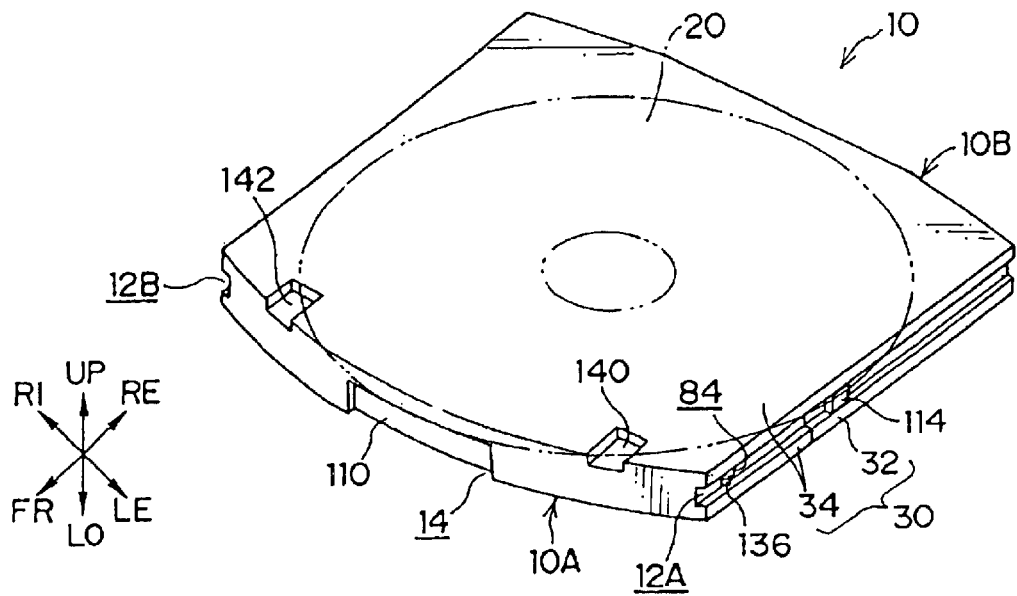
FIG. 1A is a perspective view showing a disk cartridge according to the present invention, as viewed slantwise from an upper front side.
Figure 1B:
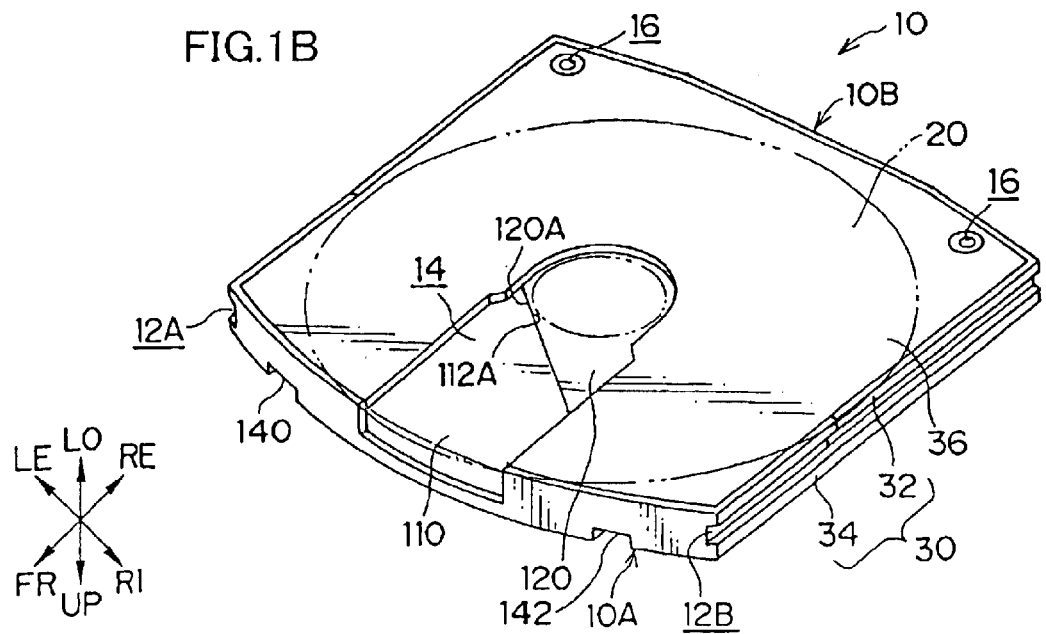
FIG. 1B is a perspective view showing the disk cartridge according to the present invention, as viewed slantwise from a lower front side.

First, a schematic explanation will be given of the disk cartridge 10. FIG. 1A is a perspective view showing the appearance of the disk cartridge 10, as viewed slantwise from the upper front side. FIG. 1B is a perspective view showing the disk cartridge 10, as viewed slantwise from the lower front side. As shown in FIGS. 1A and 1B, the disk cartridge 10 is formed into the shape of a flat case as a whole, and it contains therein a disk medium 20 serving as an information recording/reproducing medium, described later.

The front end 10A of the disk cartridge 10 is arcuately curved while the rear end 10B thereof is formed into a polygonal shape in which right and left corners are cut away in such a manner as to meet required functions. The longitudinal dimension of the disk cartridge 10 is slightly greater than the lateral dimension thereof. With these features of the above-described shapes, the direction of the disk cartridge 10 to be loaded in a drive device, not shown, can be easily observed from the external appearance, and further, the disk cartridge 10 can be prevented from being loaded in the drive device from a wrong direction.

Furthermore, a first guide groove 12A and a second guide groove 12B are formed at the right and left side surfaces of the disk cartridge 10 such that the guide grooves guide the disk cartridge 10 when the disk cartridge 10 is loaded in the drive device. Here, an unlock lever 136 and a shutter engaging portion 114, both of which will be described later, are formed at the first guide groove 12A in a projecting manner.

Moreover, an opening 14 is formed from the center portion of the lower surface of the disk cartridge 10 to the center portion in the lateral direction of a front wall of the front end 10A, and thus, it can allow access to the disk medium 20 when the disk medium 20 is in use. In other words, the disk cartridge 10 is configured such that a rotary spindle and a recording/reproducing head (for example, a laser head) of the drive device can be inserted or approach through the opening 14 when the disk medium 20 is in use. In contrast, when the disk medium 20 is not in use, the opening 14 is shut via a first shutter member 110 and a second shutter member 120, both of which will be described later, accommodated inside the disk cartridge 10, thereby preventing any intrusion of dust or the like into the disk cartridge 10.

Figure 2:
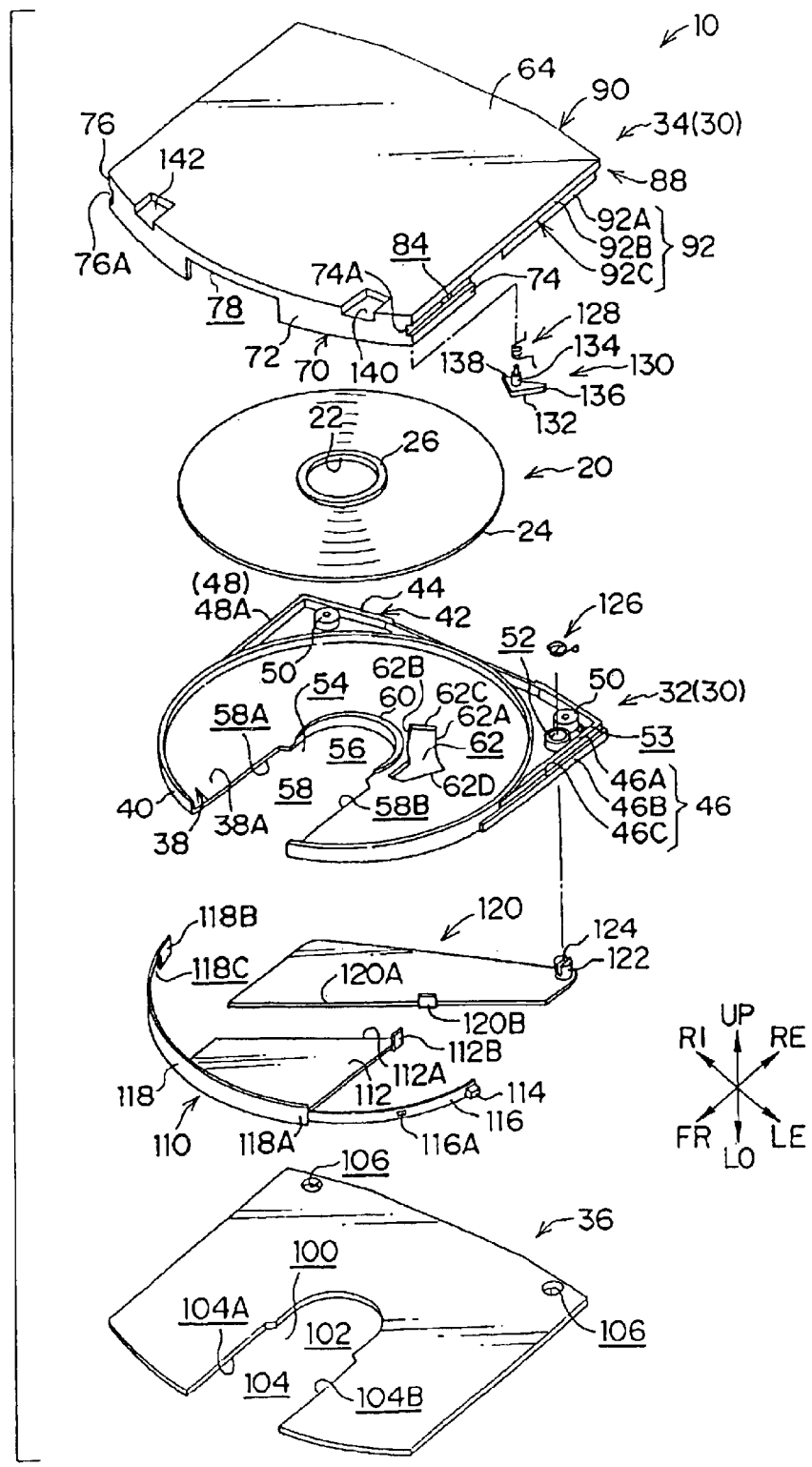
FIG. 2 is an exploded perspective view showing the disk cartridge according to the present invention, as viewed slantwise from above.
Figure 3:
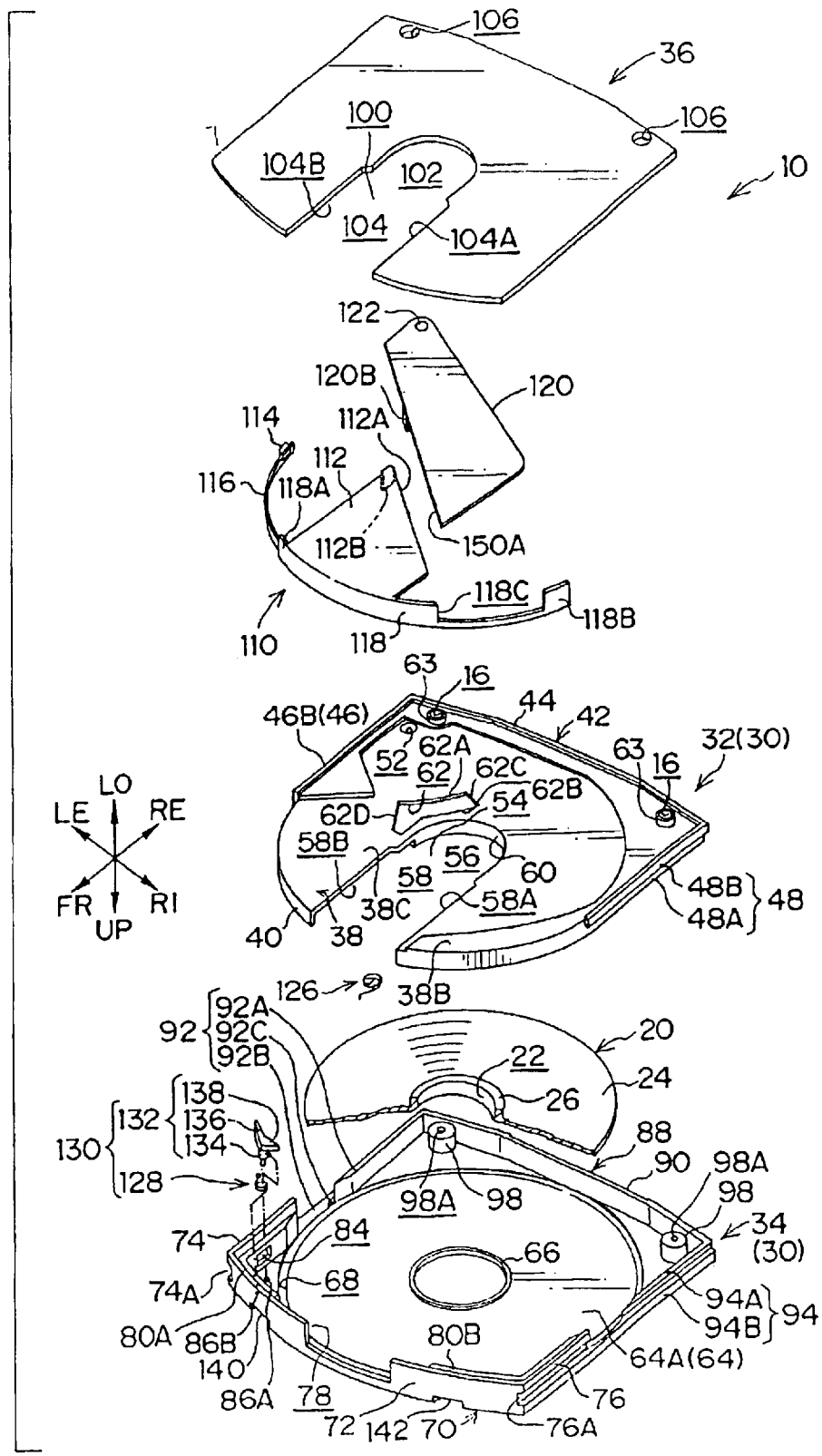
FIG. 3 is an exploded perspective view showing the disk cartridge according to the present invention, as viewed slantwise from below.

As shown in FIGS. 2 and 3, the disk cartridge 10 is provided with the disk medium 20. The disk medium 20 is formed into a disk-like shape having a center hole 22 at the center portion thereof, and a recording side (not shown) formed at the lower surface 24 of the disk medium 20 is covered with and protected by a cover layer (not shown). An annular center core 26 is attached to the center hole 22 of the disk medium 20 by adhesive or the like. The center core 26 is designed to be engageably or adsorptively retained at the tip of the rotary spindle in the drive device.

The disk medium 20 is accommodated inside a case 30. The case 30 is formed by joining a base plate 32 serving as a lower shell and a top plate 34 serving as an upper shell to each other. The lower portion of the base plate 32 of the case 30 is covered with a bottom plate 36 serving as a covering-plate. The base plate 32 and the bottom plate 36 are designed to accommodate the first shutter member 110 and the second shutter member 120 (both will be described later).

The base plate 32 is provided with a base bottom 38 made from a thin plate having a front portion formed into a semicircular shape and a rear portion formed into substantially a rectangular shape circumscribing the other half of a circle. At the circumferential edge of the front semicircle and the rear semicircle of the base bottom 38, a cylindrical wall 40 is erected upward in a predetermined height coaxially with the circle and with the same diameter as the circle. Here, the inner diameter of the cylindrical wall 40 is set to be slightly greater than the outer diameter of the disk medium 20.

Additionally, at the peripheral edge of the rear portion which is substantially rectangular shaped of the base bottom 38, a circumferential wall 42 formed into substantially a U shape, in plan view, is erected in such a manner as to surround substantially the rear half of the cylindrical wall 40. The rear wall 44 of the circumferential wall 42 is slightly bent forward at right and left corners, in plan view, and corresponds to a rear end 10B of the disk cartridge 10. The circumferential wall 42 is less in height from an upper surface 38A of the base bottom 38 than the cylindrical wall 40, and further, projects downward of a lower surface 38B of the base bottom 38 (see FIGS. 2 and 3).

A left wall 46 of the circumferential wall 42 is formed at the outer surface of the circumferential wall 42 along a tangent parallel in a longitudinal direction of the cylindrical wall 40. Furthermore, the left wall 46 is structured by a left inner wall 46A having a front end provided along the outer peripheral surface of the cylindrical wall 40 and in contacting with the peripheral surface of the cylindrical wall 40, and a left outer wall 46B provided at the exterior (left side) of the left inner wall 46A and extending slightly forward of the center portion in the longitudinal direction of the cylindrical wall 40. The left inner wall 46A is erected only on the side of the upper surface 38A of the base bottom 38 in the same height as that of the rear wall 44. Further, on the side of the upper surface 38A the height of the left outer wall 46B is lower than the height of the left inner wall 46A while it is in the same height with the rear wall 44 on the side of the lower surface 38B. Between the left outer wall 46B and the left inner wall 46A, and the cylindrical wall 40, a slot 46C whose upper portion is opened is formed.

A right wall 48 of the circumferential wall 42 has the same configuration as that of the left wall 46 except for not having a slit formed therein. In this way, the circumferential wall 42, at the side of the upper surface 38A of the base bottom 38, the rear wall 44, the left inner wall 46A and a right inner wall 48A form a substantial U shape having the same height, in plane view, and becomes an abutting region which abuts with a circumferential wall 88 of the top plate 34, which will be described later. Moreover, the rear wall 44, the left outer wall 46B and a right outer wall 48B form a substantial U shape having the same height, in plane view, at the side of the lower surface 38B of the base bottom 38, and becomes a fitting region which engages with the bottom plate 36.

In addition, the outer surface (the left surface) of the left inner wall 46A functions as a lower bottom surface of the rear portion of the first guide groove 12A of the disk cartridge 10, and further, the upper end surface of the left outer wall 46B functions as a lower wall surface of the rear portion of the first guide groove 12A. The outer surface (the right surface) of the right inner wall 48A functions as a lower bottom surface of the rear portion of the second guide groove 12B of the disk cartridge 10, and further, the upper end surface of the right outer wall 48B functions as a lower wall surface of the rear portion of the second guide groove 12B.

In the vicinity of a left corner at the rear end of the upper surface 38A in the base bottom 38 between the cylindrical wall 40 and the circumferential wall 42, a cylindrical shutter axial hole 52 is provided for pivoting the second shutter member 120, which will be described later. Furthermore, a spring holder 53 is provided in the vicinity of the shutter axial hole 52, for holding one end of a torsion spring 126, which will be described later.

An opening 54 structuring the opening 14 of the disk cartridge 10 is formed in the base plate 32. The opening 54 is formed by connecting a circular hub hole 56 having an outer diameter greater than that of the center core 26 of the disk medium 20 and a substantially rectangular window 58 for the recording/reproducing head which extends to the peripheral front end thereof along the radial direction of the semicircle of the base bottom 38 in a laterally symmetric manner and is formed by cutting away the cylindrical wall 40. Right and left widen portions 58A and 58B are formed in such a manner that the lateral width of the window 58 for the recording/reproducing head becomes greater than the diameter of the hub hole 56 except for the vicinity of a portion structured by communicating the hub hole 56, thereby achieving the insertion of a large-sized recording/reproducing head.

At the circumferential edge of the hub hole 56 of the base bottom 38 is provided with a rib 60, which is thick on the side of the upper surface 38A. A shutter guide hole 62, into which a pressing piece 112B of the first shutter member 110 (described later) and a piece 120B to be pressed of the second shutter member 120 (described later) are inserted, is provided in the vicinity on the left side of the hub hole 56. As shown, the shutter guide hole 62 is bored in such a manner that a part of a front side which is substantially sectorial defined by two arcs 62A and 62B concentrically formed coaxially with the shutter axial hole 52 and two straight lines 62C and 62D radially drawn through the axis of the shutter axial hole 52 extends further forward in a substantially quadrilateral shape.

In the meantime, as shown in FIG. 3, substantially a circular recess 38C is formed at the lower surface 38B of the base plate 32 (the base bottom 38), for actuating and for forming a space to accommodate a shutter body 112 of the first shutter member 110 and the second shutter member 120. That is, the lower end surface of the circumferential wall 42 projects downward on the side of the lower surface 38B of the base plate 32 while referring to the lower surface 38B of the base bottom 38, and further, the recess 38C is recessed upward. Consequently, the bottom plate 36 fits with the circumferential wall 42 while abutting against the lower surface 38B, thereby defining a flat space between the bottom plate 36 and the recess 38C.

In the interior of the cylindrical wall 40 of the above-described base plate 32, the disk medium 20 will be accommodated. The disk medium 20 is rested on the rib 60 with the center core 26 thereof inserted into the hub hole 56, thereby preventing the upper surface 38A of the base bottom 38 contacting with the cylindrical wall 40. In this state, the upper portion of the base plate 32 is covered with the upper plate 34.

The top plate 34 is provided with a flat plate 64 having a front end made of substantially a rectangular flat plate curved into an arcuate shape and a rear end having right and left corners cut away into a polygonal shape. The longitudinal dimension of the flat plate 64 is slightly greater than the lateral dimension thereof. At the center portion of a lower surface 64A of the flat plate 64, an annular projection 66 corresponding to the rib 60 of the base plate 32 is provided in order to prevent any contact of the disk medium 20 with the lower surface 64A.

Furthermore, an annular groove 68 corresponding to the cylindrical wall 40 of the base plate 32 is formed at the lower surface 64A of the flat plate 64. The annular groove 68 is formed in such a manner as to freely receive the cylindrical wall 40 as a whole. Moreover, the annular groove 68 is slightly greater in outer diameter (i.e., wider) at a front portion thereof than the left outer wall 46B and the right outer wall 48B of the base plate 32, and thus, can receive therein an arcuate guide wall 118 of the first shutter member 110 together with the cylindrical wall 40. Additionally, an outer wall 70 is erected downward in substantially a U shape, in plane view, on the front periphery of the flat plate 64 in such a manner as to surround the front half of the annular groove 68.

The outer wall 70 has a front wall 72, a left wall 74 and a right wall 76 in a height corresponding to the entire thickness of the disk cartridge 10. The front wall 72 is curved in conformity of the curved shape of the front end of the flat plate 64. At the center portion of the front wall 72 in the lateral direction is formed a rectangular window 78 having the lower portion cut away by a predetermined length, which therefore, serves as a component of the opening 14 of the disk cartridge 10. In other words, the width of the window 78 in the lateral direction corresponds to the width of the window 58 for the recording/reproducing head of the base plate 32, thereby structuring a part of the opening 14 of the disk cartridge 10. The front wall 72 is structured as the front end 10A of the disk cartridge 10.

The left wall 74 and the right wall 76 extend rearward from the left and right ends of the front wall 72, respectively, and further, a position facing to the front end surfaces of the left outer wall 46B and the right outer wall 48B of the base plate 32 are referred to as rear end surfaces. That is to say, each of the lower portions of the rear end surfaces of the left wall 74 and the right wall 76 of the top plate 34 abut against the front end surfaces of the left outer wall 46B and the right outer wall 48B in the base plate 32, respectively, in the assembled state.

In addition, inner walls 80A and 80B respectively formed along the inner surfaces at the right and left corners are provided at the inner side of the outer wall 70. The lower end surfaces of the inner walls 80A and 80B are positioned slightly upward of the lower end surface of the outer wall 70 (i.e., recessed inwardly of the disk cartridge 10), and thus, serves as an abutting surface to abut against the upper surface of the bottom plate 36 which fits with the outer wall 70.

Furthermore, a lateral groove 74A is formed along the longitudinal direction at the outer surface of the left wall 74 of the outer wall 70, and its bottom extends to the inner wall 80A. The lateral groove 74A structures the front portion of the first guide groove 12A of the disk cartridge 10. On the inner wall 80A is formed an unlock lever hole 84 for allowing the bottom of the lateral groove 74A to communicate with the inner side of the inner wall 80A. A axial hole 86A for pivoting a lock lever 132, described later, and a holding hole 86B for holding one end of a torsion spring 128 are provided at the lower surface 64A of the flat plate 64 which is in the vicinity of the unlock lever hole 84.

In the meantime, the right wall 76 of the outer wall 70 is configured in the same manner as the left wall 74, and therefore, it structures the front portion of the second guide groove 12B, and a lateral groove 76A having its bottom extend to the inner wall 80B is formed on the right wall 76. In contrast, none of an unlock lever hole, an axial hole and a holding hole are provided on the right wall 76 (i.e., the inner wall 80B) side. Moreover, a circumferential wall 88 corresponding to the circumferential wall 42 in the base plate 32 is erected downwardly on the rearward outer periphery of the outer wall 70 of the flat plate 64. In other words, the circumferential wall 88 is provided with a rear wall 90, a left wall 92 and a right wall 94 corresponding to the rear wall 44, the left wall 46 and the right wall 48 of the base plate 32, respectively.

The rear wall 90 abuts against the rear wall 44 of the base plate 32, thereby structuring the rear end 10B of the disk cartridge 10. On the left wall 92, a left inner wall 92A abuts against the left inner wall 46A of the base plate 32, and further, a left outer wall 92B and a slit 92C face to the left outer wall 46B and the slit 46C of the base plate 32, respectively, thereby structuring the rear left wall of the disk cartridge 10 and the rear portion of the first guide groove 12A.

Figure 4:
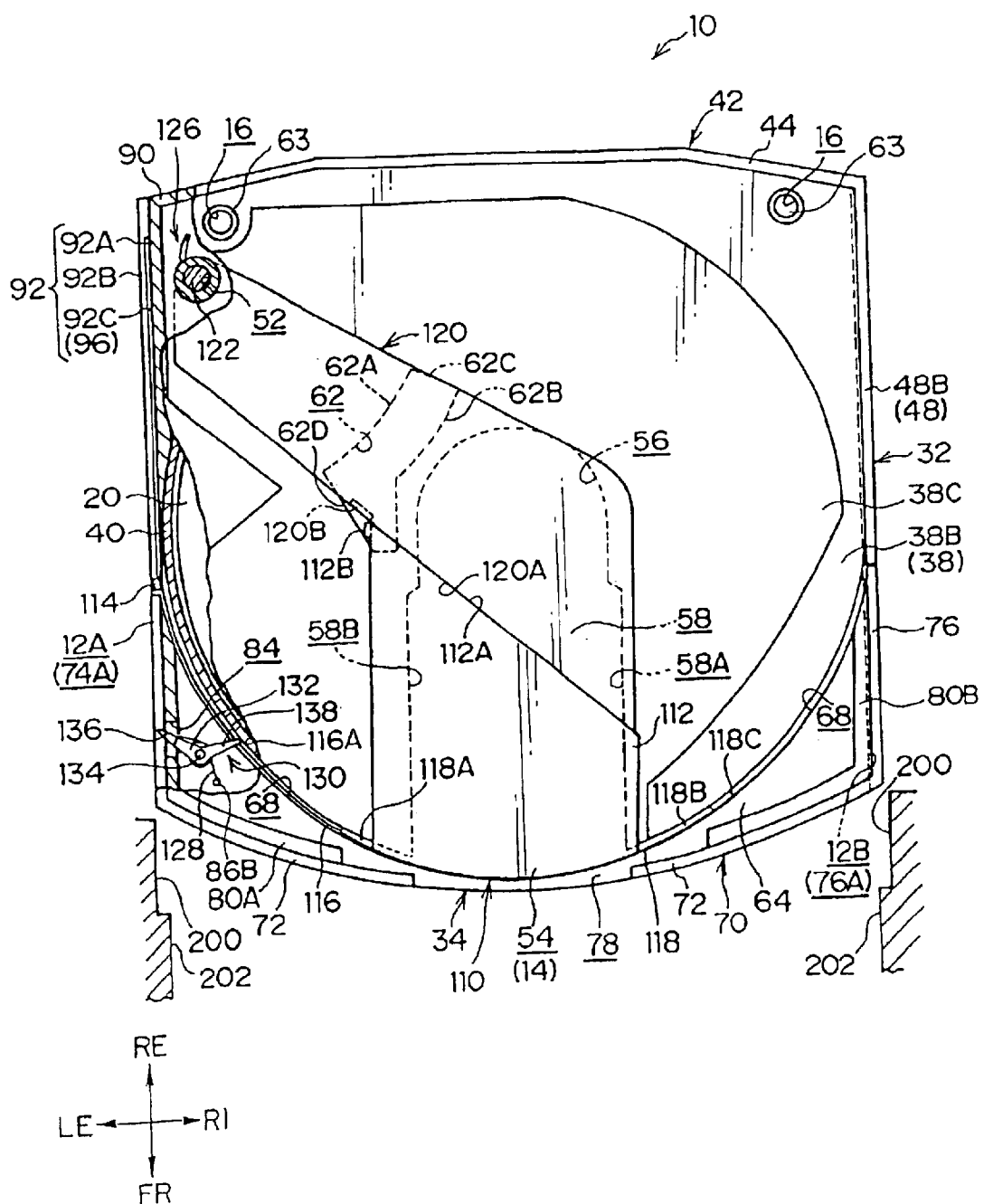
FIG. 4 is a bottom view showing, partly cut out, the entire configuration of the disk cartridge according to the present invention in an opening shut state, in which a bottom plate is detached.

Moreover, the slits 46C and 92C, which face to each other, structure a shutter guide groove 96, into which a shutter drawing portion 116 for the first shutter member 110 is inserted (see FIG. 4). The shutter guide groove 96 (i.e., the slit 92C) communicates with the annular groove 68 in the vicinity of the front end of the left inner wall 92A. That is to say, the shutter guide groove 96 is formed such that the slit 46C of the base plate 32 faces the vicinity portion of the exterior wall of the annular groove 68 in the vicinity of the front end thereof.

In the meantime, the right wall 94 is configured in the same manner as the left wall 92. On the left wall 92, a right inner wall 94A abuts against the right inner wall 48A of the base plate 32, and further, a right outer wall 94B faces the right outer wall 48B of the base plate 32, thereby structuring the rear right wall of the disk cartridge 10 and the rear portion of the second guide groove 12B.

The bottom plate 36 is disposed under the base plate 32. The profile of the bottom plate 36 is formed into substantially the same flat plate-like shape as that of the flat plate 64 of the top plate 34, and the outer periphery is slightly smaller than that of the flat plate 64. Consequently, the bottom plate 36 can fit with the outer wall 70 of the top plate 34 and the inner circumferential surface of the circumferential wall 42 (including the rear wall 44, the left outer wall 46B and the right outer wall 48B) of the base plate 32. That is to say, the bottom plate 36 is fitted and held at the circumferential wall 42 (i.e., the rear wall 44, the left outer wall 46B and the right outer wall 48B) of the base plate 32 and the inner circumferential surface of the outer wall 70 of the top plate 34 in the state in which the upper surface abuts against the lower surface 38B of the base plate 32 (i.e., the portion except for the recess 38C) and the inner walls 80A and 80B of the top plate 34.

Furthermore, an opening 100 having substantially the same shape of the opening 54 formed at the base plate 32 is formed at a position corresponding to the opening 54 in the bottom plate 36. Namely, the opening 100 is structured of a hub hole 102 corresponding to the hub hole 56, a window 104 for the recording/reproducing head corresponding to the window 58 for the recording/reproducing head and right and left widen portions 104A and 104B, thereby structuring the opening 14 of the disk cartridge 10. Moreover, the opening 54 formed at the base plate 32, the window 78 formed at the top plate 34 and the opening 100 formed at the bottom plate 36 communicate with each other, thereby forming the opening 14 of the disk cartridge 10.

With the above-described configuration, the rear end surfaces of the left wall 74 and the right wall 76 on the top plate 34 abut against the front end surfaces of the left wall 46 and the right wall 48 in the base plate 32, respectively, and further, the circumferential wall 88 of the top plate 34 abuts against the circumferential wall 42 of the base plate 32. Additionally, the base plate 32 is connected to and held in the top plate 34 with the cylindrical wall 40 of the base plate 32, which is inserted into the annular groove 68 formed at the top plate 34, thereby forming the case 30 rotatably accommodating therein the disk medium 20. Furthermore, the lower portion of the case 30 is covered with the bottom plate 36, thus forming the disk cartridge 10. Moreover, a shutter mechanism for shutting or opening the opening 14, described later, is interposed between the case 30 and the bottom plate 36. Incidentally, in the case where each of components of the shutter mechanism will be explained longitudinally or laterally, the direction in which the opening 14 shuts is used as a standard direction.

The shutter mechanism is provided with the first shutter member 110, which includes a shutter body 112 for shutting mainly the window 58 for the recording/reproducing head of the base plate 32. The shutter body 112 is made of a resin material, a metal plate or the like, and is formed into substantially a trapezoidal shape, in plane view, in other words, a thin flat plate with a curve, in such a manner as to conform to the cylindrical wall 40, at the front end of a rectangle having the length, which is substantially the same as the radius of the cylindrical wall 40 of the base plate 32, and the width, which is slightly greater than that of the window 58 for the recording/reproducing head, and slantwise cutting away the rear right corner.

The dimension of the thickness of the shutter body 112 is set to be smaller than the dimension of the height from the lower surface 38B to the recess 38C (the upper surface of the bottom plate 36) in the base plate 32. Furthermore, the end surface of the inclined side of the shutter body 112 (see FIGS. 2 to 4) serves as an abutting portion 112A which abuts against the second shutter member 120. The pressing piece 112B erected upward is disposed at the rear left corner of the shutter body 112, for pressing the second shutter member 120.

Additionally, the arcuate guide wall 118, which slides along the outer peripheral surface of the cylindrical wall 40 of the base plate 32 and shuts a part of the window 58 for the recording/reproducing head of the base plate 32, is integrally erected upward at the front end of the shutter body 112. The arcuate guide wall 118 is formed into an arcuate shape corresponding to the outer periphery of the cylindrical wall 40, in plane view, and further, the height of the arcuate guide wall 118 is set such that the upper end portion faces the upper end surface of the cylindrical wall 40 when the arcuate guide wall 118 is assembled in the base plate 32 (see FIG. 8A).

The arcuate guide wall 118 has a shorter protruding portion 118A protruding leftward of the shutter body 112 and a longer protruding portion 118B protruding rightward thereof. The protruding portion 118B protruding rightward has a window 118C cut away at the lower portion thereof and opened in substantially a rectangular shape in such a manner as to correspond to the window 78 of the top plate 34. Moreover, the respective dimensions of the shutter member are determined in such a manner that the window 118C is positioned at the front in the state in which the opening 14 is opened by the shutter mechanism.

In the meantime, the shutter drawing portion 116 is formed to be connected with the tip of the portion 118A protruding leftward of the arcuate guide wall 118. The shutter drawing portion 116 is formed into a thin plate-like shape which is satisfactorily thinner than the arcuate guide wall 118 and elastically deforms in the thickness direction. The shutter engaging portion 114 of a small block type is fixed to the tip of the shutter drawing portion 116. As shown in FIG. 8B, the vertical dimensions, i.e., the widths of the shutter drawing portion 116 and the shutter engaging portion 114 are equal to the vertical dimensions of the shutter guide groove 96 (i.e., the slit 92C) and the first guide groove 12A, respectively. Moreover, a small hole 116A is provided at the middle portion of the shutter drawing portion 116, and thus, engages with a lock pawl 138, described later.

As shown in FIG. 4, which is a bottom view excluding the bottom plate 36, and FIG. 8A, in the first shutter member 110, the shutter body 112 is interposed between the recess 38C of the base plate 32 and the upper surface of the bottom plate 36 in the state in which the arcuate guide wall 118 is inserted into the annular groove 68 formed at the top plate 34 together with the cylindrical wall 40 of the base plate 32 and is slidably disposed along the outer peripheral portion of the cylindrical wall 40, and normally, it shuts a part of the opening 14 (mainly the window 58 for recording/reproducing head).

In the state in which the first shutter member 110 is arranged as described above, the pressing piece 112B of the shutter body 112 is inserted into the shutter guide hole 62 formed at the base plate 32, and thus, is positioned forwardly of the guide hole 62. Moreover, the tip of the shutter drawing portion 116 is located at the shutter guide groove 96 communicating with the annular groove 68 of the top plate 34, and further, the shutter engaging portion 114 is located substantially at the center portion, inner side of the first guide groove 12A (i.e., rearward of the left wall 74 of the top plate 34), and thus, is exposed to the outside. Consequently, the shutter engaging portion 114 is moved rearward from the outside, so that the arcuate guide wall 118 slides along the outer peripheral surface of the cylindrical wall 40 via the shutter drawing portion 116, and thus, the shutter body 112 is pivoted (see FIGS. 4 to 7).

Additionally, the shutter mechanism is provided with a lock device 130 for restricting the pivoting of the first shutter member 110. The lock device 130 includes the lock lever 132 having substantially a V shape, in plane view. The lock lever 132 is disposed at the center portion, and is structured of a spindle 134 supported pivotably on the axial hole 86A formed at the top plate 34, an unlock lever 136 disposed at one end and projecting inward of the first guide groove 12A (the lateral groove 74A) from the unlock lever hole 84, and the lock pawl 138 disposed at the other end in a manner engageable with the small hole 116A of the shutter drawing portion 116.

One end of the torsion spring 128 is retained to the spindle 134 of the lock lever 132. The other end of the torsion spring 128 is inserted into and held in the holding hole 86B formed at the top plate 34. In this way, the lock lever 132 is urged by the torsion spring 128 in a direction in which the lock pawl 138 engages with the small hole 116A of the shutter drawing portion 116, thereby normally keeping the opening 14 in the shut state. When the unlock lever 136 is pressed rearward, the lock lever 132 is pivoted about the spindle 134 against the urging force of the torsion spring 128, thereby disengaging the lock pawl 138 from the small hole 116A of the shutter drawing portion 116.

In addition, the shutter mechanism is provided with the second shutter member 120 for shutting mainly the hub hole 56 formed at the base plate 32. The second shutter member 120 is made of a resin material, a metal plate or the like, and is formed into a thin flat plate having substantially a trapezoidal shape (i.e., a trapezoid having parallel lines at lateral ends are offset with a great distance between the parallel lines), in plane view. The dimension of the thickness of the second shutter member 120 is set to be equal to that of the shutter body 112 of the first shutter member 110.

The end surface of the inclined front end of the second shutter member 120 serves as an abutting portion 120A which abuts against the abutting portion 112A of the shutter body 112 in the first shutter member 110. The piece 120B to be pressed is erected upward (i.e., inward of the case 30) at a position facing to the pressing piece 112B of the shutter body 112 of the abutting portion 120A. The piece 120B to be pressed corresponds to an arcuate portion of the shutter guide hole 62 in the base plate 32. The piece 120B to be pressed is set to such a width as to abut against the pressing piece 112B all the time within a pivotable range of the shutter body 112, that is, within a movable range of the pressing piece 112B to be restricted by the shutter guide hole 62.

Moreover, the second shutter member 120 is provided at the rear left end thereof with a pivotable shaft 122 erected upward. The pivotable shaft 122 corresponds to the shutter axial hole 52 formed at the base plate 32, and has a slot 124 at the upper end thereof. In the second shutter member 120, the pivotable shaft 122 is inserted into the shutter axial hole 52 formed at the base plate 32, and further, is interposed between the recess 38C formed at the base plate 32 and the upper surface of the bottom plate 36 in the state in which the piece 120B to be pressed is inserted into the shutter guide hole 62. Additionally, one end of the torsion spring 126 is retained to the slot 124 of the pivotable shaft 122 while the other end of the torsion spring 126 is retained to the spring holder 53 of the base plate 32, so that the second shutter member 120 is urged all the time toward a direction abutting against the first shutter member 110.

With the above-described configuration, the abutting portion 120A of the second shutter member 120 normally abuts against the abutting portion 112A of the first shutter member 110, and therefore, is configured to shut mainly the hub hole 56 of the base plate 32. That is to say, the first shutter member 110 and the second shutter member 120 are designed to shut the opening 14 of the disk cartridge 10 in the state in which the mutual abutting portions 112A and 120A abut against each other usually, as shown in FIG. 1B. At this time, the pressing piece 112B of the first shutter member 110 and the piece 120B to be pressed of the second shutter member 120 engage with the front inner edge of the shutter guide hole 62 of the base plate 32, thereby maintaining the state in which the abutting portions 112A and 120A abut against each other (see FIG. 4).

Here, two position restricting holes 16 are provided in the vicinity of the rear end 10B at the lower surface of the disk cartridge 10, for restricting (i.e., detecting) the position of the disk cartridge 10 positioned inside of the drive device. Namely, a cylindrical projection 50 is erected at each of both corners at the rear end of the upper surface 38A of the base bottom 38 between the cylindrical wall 40 and the circumferential wall 42. The cylindrical projection 50 has the same height as that of the rear wall 44 of the circumferential wall 42. Here, a through hole and a conical screw receiving portion corresponding to the head of a fixing screw are formed inside of the cylindrical projection 50, although not shown.

At a position corresponding to the cylindrical projection 50 at the lower surface 38B of the base bottom 38, there is erected downward a cylindrical projection 63 communicating coaxially with the inner side of the cylindrical projection 50 in such a manner that the screw or a tool can be inserted thereinto. The outer periphery of the cylindrical projection 63 is used for positioning the bottom plate 36, and its inner side serves as the position restricting hole 16 formed at the disk cartridge 10.

Here, a circular cylinder 98 is disposed at a position corresponding to each of the cylindrical projections 50 of the base plate 32 between the circumferential wall 88 and the annular groove 68. The circular cylinder 98 is the same in height as the rear wall 90 of the circumferential wall 88. The lower end surface abuts against the upper end surface of the cylindrical projection 50 in the base plate 32. A screw hole 98A is provided at the center portion of the circular cylinder 98. A screw having a head engaged with the screw receiving portion inside of the cylindrical projection 50 formed at the base plate 32 is screwed into the screw hole 98A, so that the position restricting hole 16 (i.e., the cylindrical projection 63) is positioned with respect to the top plate 34.

With the above-described configuration, the top plate 34 is connected to and held in the base plate 32 while covering the upper portion of the base plate 32, thereby forming the case 30 rotatably accommodating the disk medium 20 therein. Furthermore, a through hole 106 corresponding to the outer diameter of the cylindrical projection 63 at the base plate 32 is provided at a position corresponding to the cylindrical projection 63 at the bottom plate 36. When the lower portion of the case 30 accommodating the disk medium 20 therein is covered with the bottom plate 36, the cylindrical projection 63 of the base plate 32 is passed through and fitted with the through hole 106.

Additionally, two notches 140 and 142 are cut away at the upper surface of the front end 10A of the disk cartridge 10. One notch 140 of the notches (e.g., the left notch) is used for restricting (i.e., detecting) a position while the other notch 142 (e.g., the right notch) is used for holding and actuating the rotary spindle. Each of the notches 140 and 142 are cut away in substantially a rectangular shape from the front end of the flat plate 64 of the top plate 34 to the upper end of the front wall 72 except for the upper portion of the window 78, and therefore, into substantially a recessed shape, in plane view and from front view.

Figure 21:
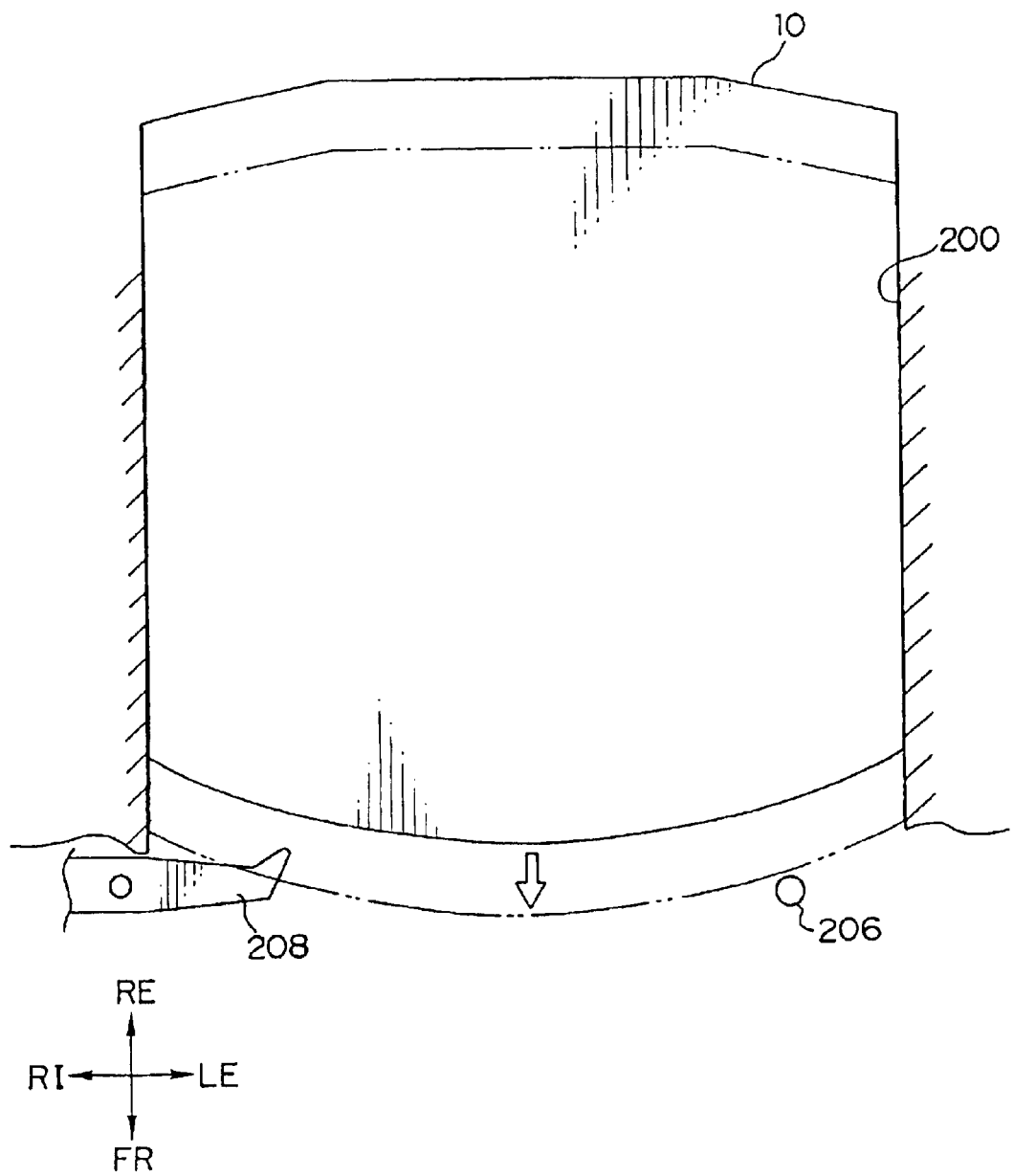
FIG. 21 is a view schematically showing the state in which a disk cartridge is inserted into a drive device in the prior art.

Consequently, even if the front end 10A of the disk cartridge 10, that is, the front wall 72 is arcuately curved, the sensor member 206 serving as a restricting member for detecting the position of the disk cartridge 10 inserted into the drive device (see FIG. 21) and the other sensor member 208 serving as a detecting member for holding and actuating the rotary spindle in the drive device (see FIG. 21) can favorably engage with the notches 140 and 142 with secureness when the disk cartridge 10 is inserted into the drive device. In this manner, the disk cartridge 10 can be positioned with respect to the drive device with high accuracy.

Next, explanation will be made on the function of the disk cartridge 10 such configured as described above. In the disk cartridge 10 having the above-described configuration, the opening 14 is shut by the first shutter member 110 and the second shutter member 120 when the disk medium 20 is not in use. In other words, the abutting portion 112A of the first shutter member 110 abuts against the abutting portion 120A of the second shutter member 120, as shown in FIG. 4. The first shutter member 110 shuts mainly the window 58 for the recording/reproducing head of the base plate 32, and further, the second shutter member 120 shuts the hub hole 56 of the base plate 32.

At this time, the small hole 116A formed at the shutter drawing portion 116 engages with the lock pawl 138 of the lock device 130, thereby restricting the first shutter member 110 from being pivoted in the opening direction of the opening 14 so as to keep the opening 14 in the shut state. In the meantime, the second shutter member 120 is urged in the direction abutting against the first shutter member 110 by the torsion spring 126, thereby keeping the opening 14 in the shut state. Consequently, it is possible to prevent any intrusion of dust into the disk cartridge 10 while the disk medium 20 is not in use, namely, to prevent any adhesion of the dust to the lower surface 24 of the disk medium 20.

The disk cartridge 10 is loaded in the drive device when the disk medium 20 is in use, namely, when information is recorded in the disk medium 20 or the information recorded in the disk medium 20 is reproduced. In loading the disk cartridge 10 in the drive device, the disk cartridge 10 is inserted into an insertion port 200 of the drive device with the front end 10A of the disk cartridge 10 in the front position(see FIGS. 4 to 7).

By inserting the disk cartridge 10, guide projections 202 of the drive device are inserted into the first guide groove 12A and the second guide groove 12B formed at the disk cartridge 10, respectively. As the disk cartridge 10 is further inserted, the guide projection 202 inserted into the first guide groove 12A is relatively moved rearward of the first guide groove 12A, and thus, abuts against the unlock lever 136 positioned inside of the first guide groove 12A, thereby pressing the unlock lever 136 backward.

As shown in FIG. 5, when the unlock lever 136 is pressed backward, the lock lever 132 is pivoted about the spindle 134 (i.e., the axial hole 86A), so that the unlock lever 136 is retreated into the unlock lever hole 84, and further, the lock pawl 138 is disengaged from the small hole 116A formed at the shutter drawing portion 116. Consequently, the first shutter member 110 is unlocked, and thus, can be pivoted freely.

Figure 6:
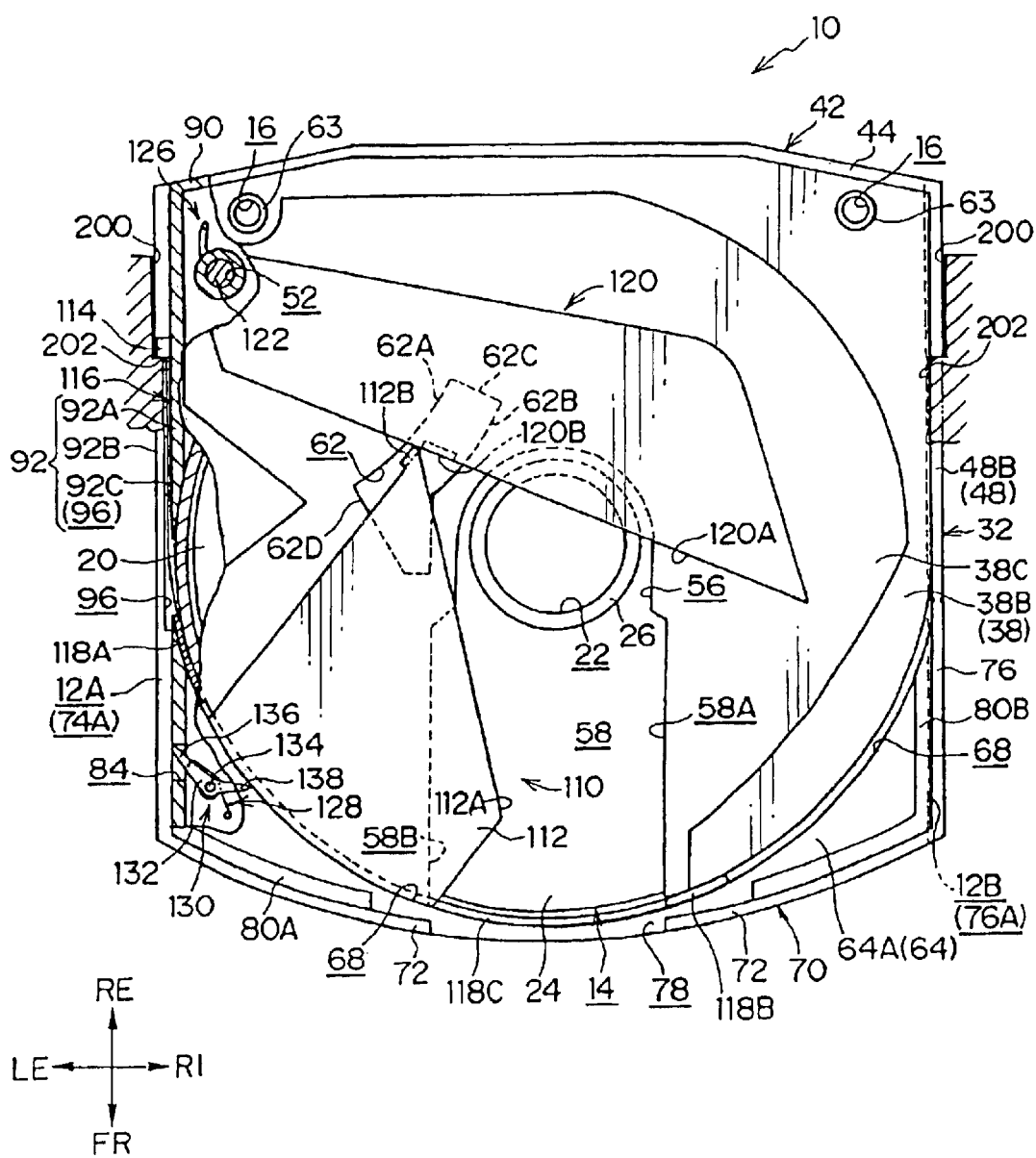
FIG. 6 is a view showing the disk cartridge according to the present invention in a process for opening the opening, similarly to FIG. 4.

When the guide projection 202 in the drive device is relatively moved further backward in the inner side of the first guide groove 12A, the guide projection 202 engages with the shutter engaging portion 114 positioned inside the first guide groove 12A while keeping the above-described unlocked state, to thus press the shutter engaging portion 114 backward. When the shutter engaging portion 114 is pressed backward, the unlocked first shutter member 110 is pivoted, as shown in FIG. 6.

Namely, together with the backward movement of the shutter engaging portion 114, the shutter drawing portion 116 is moved backward in the inner side of the shutter guide groove 96 extending in the tangential direction of the cylindrical wall 40. Consequently, the arcuate guide wall 118 is pivoted while sliding along the outer peripheral surface of the cylindrical wall 40. Upon the pivoting of the arcuate guide wall 118, the shutter body 112 disposed integrally with the arcuate guide wall 118 is pivoted along the cylindrical wall 40 (i.e., about the axis of the cylindrical wall 40).

Upon the pivoting of the first shutter member 110, the pressing piece 112B of the shutter body 112 is moved substantially backward in the inner side of the shutter guide hole 62. That is to say, the pressing piece 112B separated from the axis of the cylindrical wall 40 is pivoted about the axis of the cylindrical wall 40. When the pressing piece 112B is moved substantially backward, the piece 120B to be pressed of the second shutter member 120, which is arranged in such a manner as to abut against the pressing piece 112B, is moved along the arcuate portion of the shutter guide hole 62 while being pressed substantially backward. Upon the movement of the piece 120B to be pressed, the second shutter member 120 is pivoted in the direction to be separated from the first shutter member 110 about the pivoting shaft 122 against the urging force of the torsion sprint 126.

Figure 7:
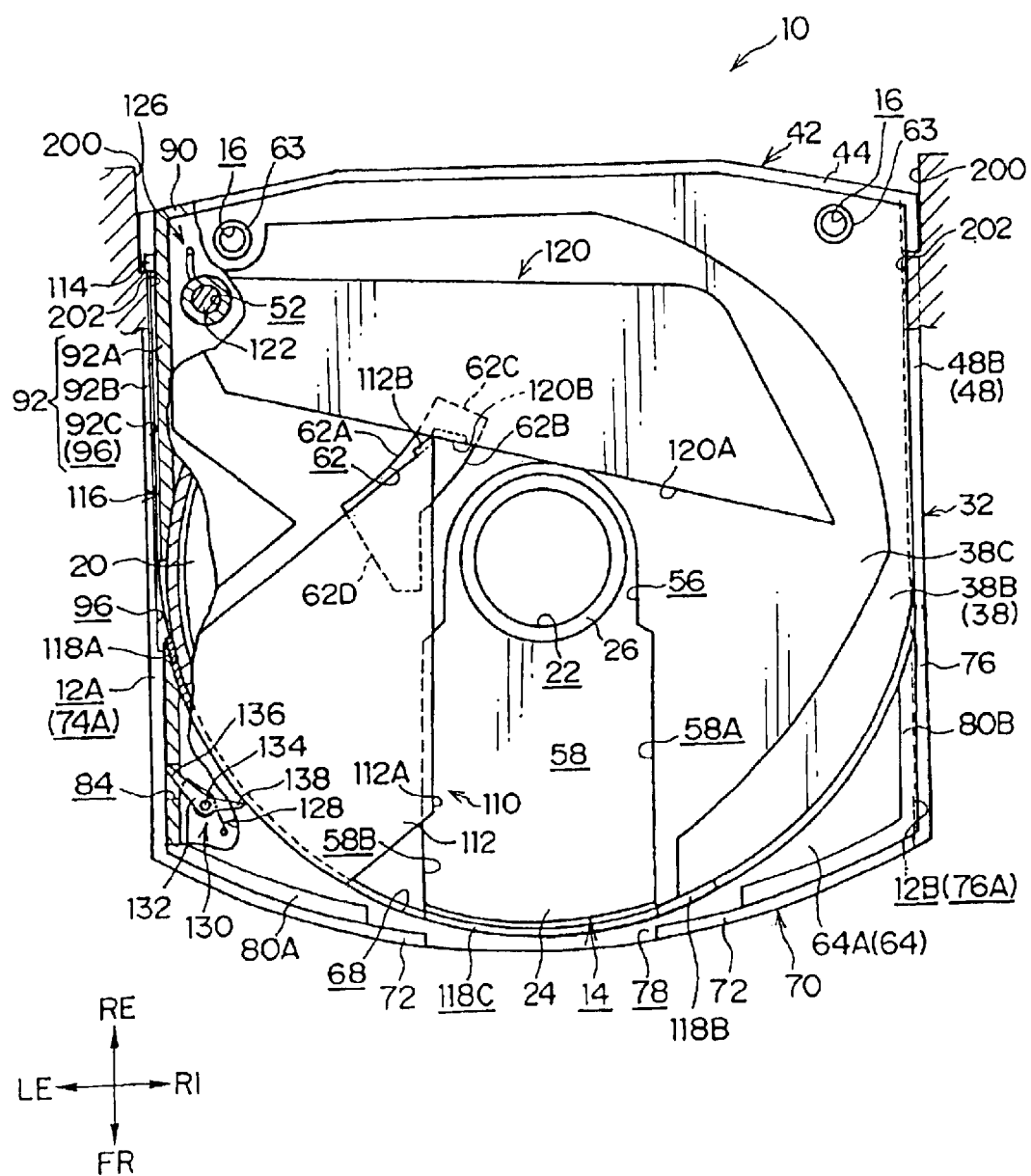
FIG. 7 is a view showing the disk cartridge according to the present invention in an opened state, similarly to FIG. 4.

When the guide projection 202 of the drive device is relatively moved further backward in the inner side of the first guide groove 12A while engaging with the shutter engaging portion 114 (pressing the shutter engaging portion 114 backward), the first shutter member 110 (i.e., the shutter body 112 and the arcuate guide wall 118) and the second shutter member 120 are further pivoted, thereby opening the window 58 for the recording/reproducing head and the hub hole 56, as shown in FIG. 7. In this state, the window 118C of the arcuate guide wall 118 is located at the front portion of the disk cartridge 10, so that the front portion of the window 58 for the recording/reproducing head also is opened through the window 78 of the top plate 34. That is, the opening 14 of the disk cartridge 10 is opened.

With the above-described configuration, the first shutter member 110 and the second shutter member 120 are moved (i.e., pivoted) in the directions different from each other while the abutting portions 112A and 120A are separated from each other, thereby opening the opening 14 of the disk cartridge 10 while the shutter moving area is reduced.

Furthermore, when the disk cartridge 10 in the present embodiment is inserted back to a predetermined position in the drive device, the sensor member 206 (see FIG. 21), which serves as the restricting member for restricting and detecting the position, engages with one notch 140, so that a positioning mechanism, not shown, in the drive device is inserted into the position restricting hole 16, thereby achieving accurate positioning. Therefore, it is possible to prevent further insertion of the disk cartridge 10, and to inhibit the opening 14 from being shut by the urging force of the torsion spring 126 or the disk cartridge 10 from being moved in a discharging direction (i.e., toward the insertion port 200 side).

Moreover, the other sensor member 208 (see FIG. 21), which serves as the detecting member for holding and actuating the rotary spindle, engages with the other notch 142. Consequently, the rotary spindle is inserted through a portion corresponding to the hub hole 56 of the opening 14 into the disk cartridge 10 accurately positioned inside of the drive device, that is, the center core 26 of the disk medium 20 accurately positioned with respect to the rotary spindle. The center core 26 is held at the tip of the rotary spindle by engagement or adsorption. In this state, the disk medium 20 is rotated about the axis, and further, the recording/reproducing head is inserted from a portion corresponding to the window 58 for the recording/reproducing head at the opening 14, and then, the information is recorded on the recording side of the disk medium 20 or the information recorded on the recording side is reproduced.

In the meantime, when the disk cartridge 10 is discharged from the drive device, the rotary spindle is released from being engageably held or adsorptively held, and further, it can be moved in the discharging direction (i.e., toward the insertion port 200 side) by withdrawing the positioning mechanism from the position restricting hole 16. At this moment, the disk cartridge 10 is moved first from the rear end 10B by the urging force of the torsion spring 126 or the pressing force in the discharging direction which is applied by the drive device. Together with this movement, the pressing force via the guide projection 202 cannot be applied to the shutter engaging portion 114 while the guide projection 202 of the drive device engages with the shutter engaging portion 114, so that the first shutter member 110 can be pivoted.

The disk cartridge 10, in which the first shutter member 110 can be pivoted, shuts the opening 14 while being moved in the discharging direction, as described above. In other words, the second shutter member 120 is pivoted in the direction in which the opening 14 is shut while pressing the pressing piece 112B of the first shutter member 110 substantially forward at the piece 120B to be pressed by the urging force of the torsion spring 126. Moreover, the first shutter member 110 pressed substantially forward by the pressing piece 112B is pivoted in the direction in which the opening 14 is shut by the pressing.

When the first shutter member 110 and the second shutter member 120 are pivoted to be returned to their own initial positions, respectively, the opening 14 is shut. The pressing piece 112B of the first shutter member 110 returned to its initial position engages with the front inner edge of the shutter guide hole 62, thereby inhibiting the first shutter member 110 and the second shutter member 120, in which the piece 120B to be pressed abuts against the pressing piece 112B, from being further pivoted by the urging force of the torsion spring 126.

The piece 120B to be pressed of the second shutter member 120 may be located at its initial position to engage with the circumferential edge of the shutter guide hole 62, thereby inhibiting the first shutter member 110 and the second shutter member 120 from being further pivoted beyond their initial positions. Otherwise, the tip of the protruding portion 118B of the arcuate guide wall 118 of the first shutter member 110 may be located at its initial position, and thus, engages with the widen portion of the annular groove 68, thereby inhibiting the first shutter member 110 and the second shutter member 120 from being further pivoted beyond their initial positions.

When the disk cartridge 10 is further moved in the discharging direction until the guide projection 202 is moved in front of the unlock lever hole 84 of the first guide groove 12A, the lock lever 132 is pivoted by the urging force of the torsion spring 128, so that the unlock lever 136 projects into the first guide groove 12A, and further, the lock pawl 138 engages with the small hole 116A of the shutter drawing portion 116 in the first shutter member 110. In this way, the disk cartridge 10 is restored into the state before being loaded in the drive device, thereby inhibiting the first shutter member 110 from being pivoted so as to keep the opening 14 in the shut state.

As described above, the disk cartridge 10 is loaded in the drive device from the front (i.e., in the direction indicated by the arrow FR) while being guided to the drive device by the first guide groove 12A and the second guide groove 12B. When the disk cartridge 10 is loaded in the drive device, the opening 14 is opened, and further, is detected and positioned with respect to the drive device by the position restricting hole 16 and the notches 140 and 142, thus recording the information in the disk medium 20 inside of the drive device or reproducing the information recorded in the disk medium 20 can be carried out.

Since the top plate 34 serving as the upper shell of the disk cartridge 10 is assembled with the base plate 32 serving as the lower shell with high accuracy, the positions of the hub holes 56 and 102 can be accurately positioned with respect to the rotary spindle. Thus, the center core 26 of the disk medium 20 can be accurately disposed. Furthermore, since the top plate 34 can securely have sufficient strength, the notches 140 and 142 can be machined with high accuracy, and further, they are formed at the upper portions of the front wall 72 of the disk cartridge 10, and thus, promptly engage with the sensor members 206 and 208 in the drive device, thereby enabling the positioning mechanism to be securely actuated. Moreover, the inserting direction of the disk cartridge 10 into the drive device can be more readily observed from the outside, thereby preventing any erroneous insertion with certainty.

Here, the shape of the notches 140 and 142 is not limited to the shape shown in the drawings, and therefore, it may be, for example, a groove (not shown) as long as the notches 140 and 142 can favorably engage with the sensor members 206 and 208 (neither of which are limited to the shape shown in the drawings) in the drive device. Furthermore, the positions in which the notches are provided are not limited to the position shown in the drawings as long as the notches are formed on the front wall 72 (preferably, at the upper portions of the front wall 72) of the disk cartridge 10.

Additionally, in the case where the notches 140 and 142 serving as the position restricting devices are formed at the right and left sides, as shown in the drawings, it is preferable that one notch 140 can be used as the positioning portion for restricting (i.e., detecting) the insertion position of the disk cartridge 10 to the drive device while the other notch 142 can be used as the operating portion for holding and actuating the rotary spindle in the center core 26. However, the number of notches is not particularly limited to two as in the present embodiment. Three or more notches may be provided at appropriate positions in accordance with the design of the various kinds of sensor members in the drive device, to the contrary, only one notch may be formed. In the case of having only one notch, for example, the notch 140 may be provided with a step formed at the interior thereof, in which either one of a lower step and an upper step can be used for restricting (i.e., detecting) the insertion position, and the other step for holding and actuating the rotary spindle.

The disk cartridge 10 is configured as described above. Next, position restricting (i.e., positioning or position detecting) devices will be explained below in other embodiments in reference to FIGS. 9A to 20. First, explanation will be made on a second embodiment as shown in FIGS. 9A to 13B. Components corresponding to or similar to those in the first embodiment are designated by the same reference numerals, and therefore, its explanation will be omitted. Also in a third and a fourth embodiment, components corresponding to or similar to those in the first embodiment are designated by the same reference numerals, and therefore, its explanation will be omitted, like in the second embodiment.

In a disk cartridge 10 shown in FIGS. 9A to 13B, reference holes 150 and 152 for positioning (i.e., detecting) the disk cartridge 10 inside of a drive device are formed at the lower surface near a front end 10A and in the vicinity of a first guide groove 12A and a second guide groove 12B, respectively, and further, guide grooves 146 and 148 communicating with the reference holes 150 and 152, respectively, are cut away at the front end 10A. The reference hole 150 near the first guide groove 12A is formed into a circular shape; in contrast, the reference hole 152 near the second guide groove 12B is formed into substantially a slot-like shape which is shorter in a loading direction in which the disk cartridge 10 is loaded in the drive device.

Figure 11:
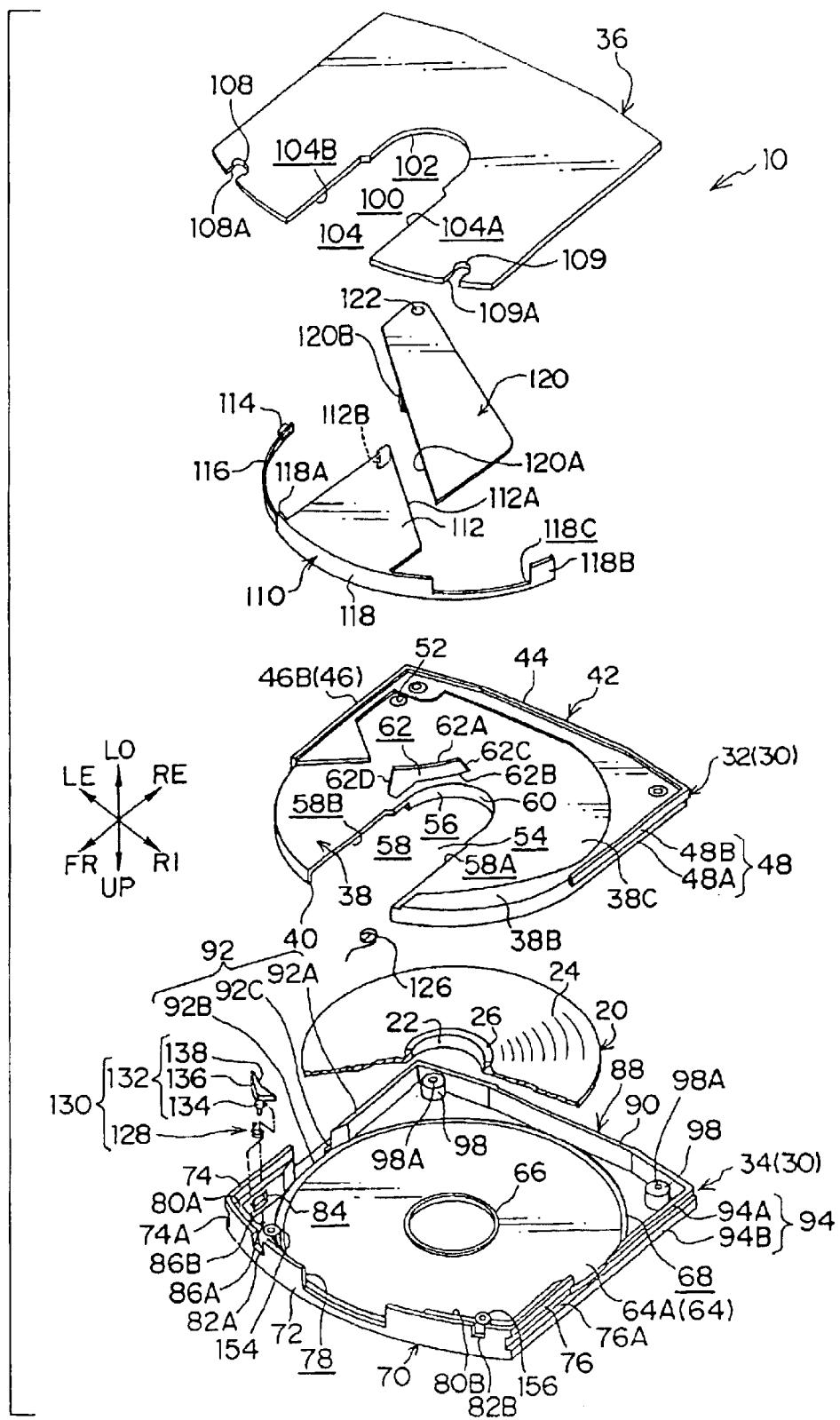
FIG. 11 is an exploded perspective view showing the disk cartridge according to the second embodiment of the present invention, as viewed slantwise from below.
Figure 12:
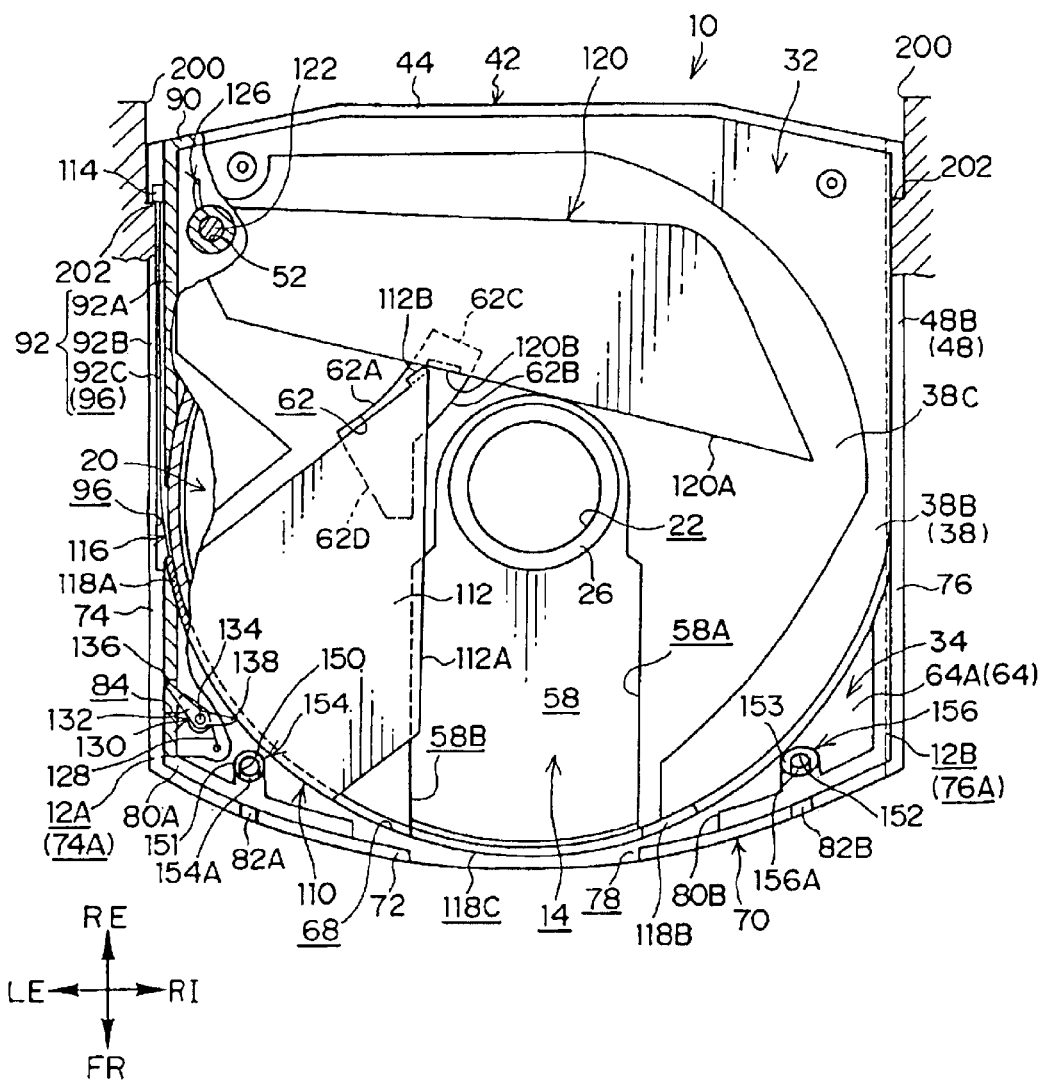
FIG. 12 is a bottom view showing, partly cut out, the entire configuration of the disk cartridge in the second embodiment according to the present invention in an opening opened state, in which a bottom plate is detached.

That is to say, as shown in FIGS. 11 and 12, cylindrical bosses 154 and 156 are disposed integrally with inner walls 80A and 80B at substantially the laterally symmetric positions between the inner wall 80A and an annular groove 68 and between the inner wall 80B and the annular groove 68, respectively. The boss 154 is formed into a circular shape, in plane view, and is disposed in the vicinity of a left wall 74, in contrast, the boss 156 is formed into substantially a slot-like shape, in plane view, in which the length is shorter in the direction in which the disk cartridge 10 is loaded in the drive device, and is disposed in the vicinity of a right wall 76. Holes bored at the centers of both of the bosses 154 and 156 serve as the reference holes 150 and 152 for positioning the disk cartridge 10 in longitudinal and lateral directions with respect to the drive device of, respectively.

Figure 13A:
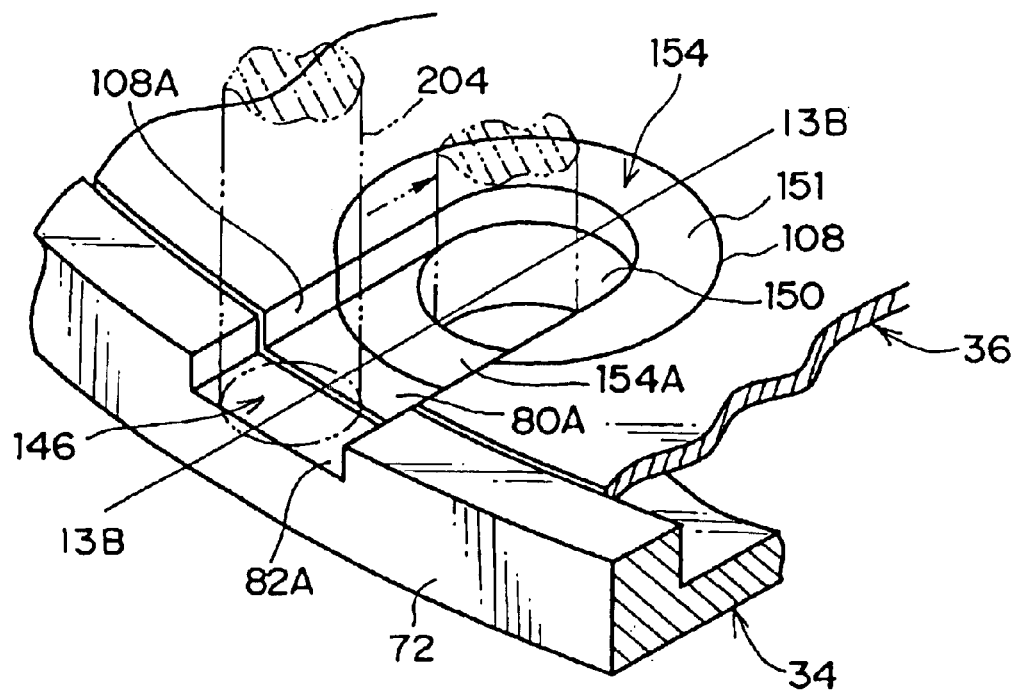
FIG. 13A is an enlarged view showing essential parts of the disk cartridge according to the second embodiment of the present invention.
Figure 13B:
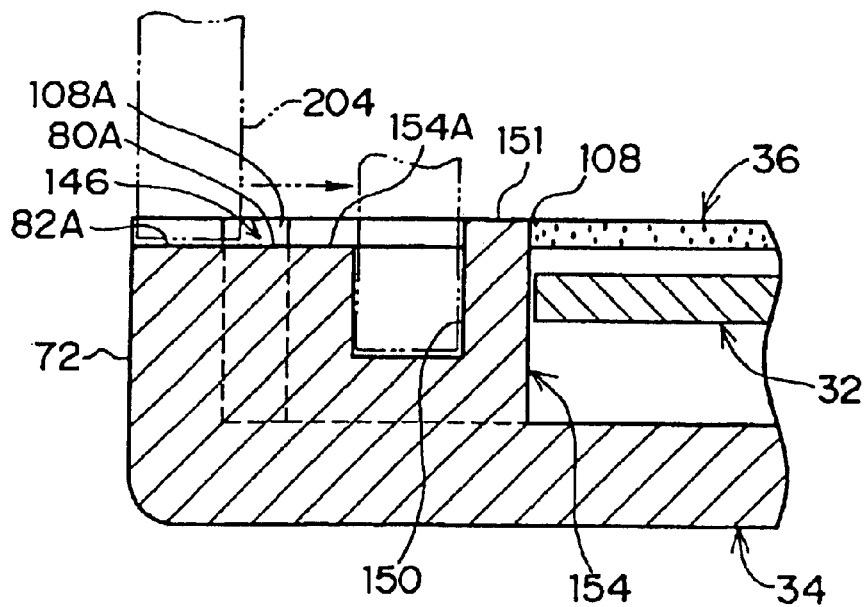
FIG. 13B is a cross-sectional view taken along a line 13B—3B of FIG. 13A.

Moreover, a notch 154A having substantially the same width as the diameter of the reference hole 150 is provided at the lower front edge of the boss 154, and a notch 156A having substantially the same width as the diameter (i.e., the longer diameter) in the major axial direction of the reference hole 152 is provided at the lower front edge of the boss 156. The lower ends having substantially a C shape, in plane view, except for the respective notches 154A and 156A of the bosses 154 and 156 function as reference surfaces 151 and 153 for positioning the vertical (i.e., height) direction of the disk cartridge 10, respectively. Here, as shown in FIGS. 11, 13A and 13B, the depth of each of the notches 154A and 156A is the same as the thickness of a bottom plate 36. Incidentally, although only the boss 154 is shown in FIGS. 13A and 13B, the same goes for the boss 156.

Figure 10:
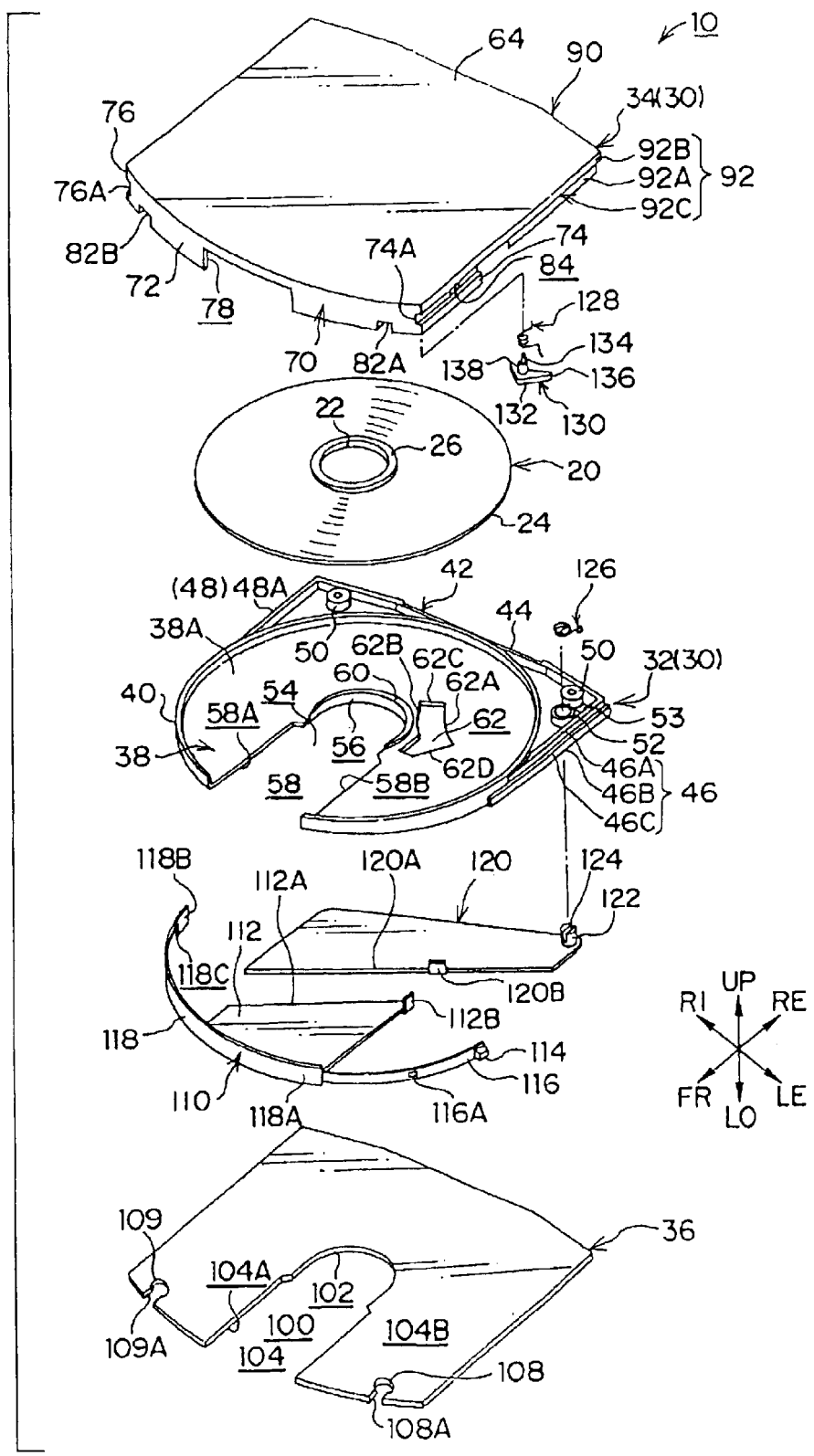
FIG. 10 is an exploded perspective view showing the disk cartridge according to the second embodiment of the present invention, as viewed slantwise from above.

As shown in FIGS. 10 and 11, through holes 108 and 109, each having an inner diameter equal to the outer diameter of each of the bosses 154 and 156, are provided at positions corresponding to the bosses 154 and 156 in the bottom plate 36, respectively. From the through holes 108 and 109 to their front ends, notches 108A and 109A, each having substantially the same width as that of each of the notches 154A and 156A of the bosses 154 and 156 are provided. Furthermore, notches 82A and 82B, each having substantially the same width as that of each of the notches 108A and 109A and the same depth as the thickness of the bottom plate 36, are also provided on a front wall 72 of a top plate 34 at positions corresponding to the notches 108A and 109A, respectively.

Consequently, as shown in FIGS. 13A and 13B, these notches 82A, 108A and 154A communicate with each other, and further, the inner wall 80A defines the guide groove 146. In the same manner, the notches 82B, 109A and 156A communicate with each other, and further, the inner wall 80B defines the guide groove 148. In this way, the guide groove 146 communicates with the reference hole 150, and in contrast, the guide groove 148 communicates with the reference hole 152. In other words, the guide grooves 146 and 148 are provided so as to extend from the reference holes 150 and 152 toward the front end 10A, wherein the width of the guide groove 146 is substantially the same as the diameter of the reference hole 150. The width of the guide groove 148 is substantially the same as the diameter (i.e., the longer diameter) in the major axial direction of the reference hole 152. Here, it is understood that the reference holes 150 and 152 are formed deeper than the guide grooves 146 and 148.

In the present second embodiment, no reference hole is formed in the vicinity of a rear end 10B. Therefore, in this embodiment, the bosses 154 and 156 disposed at the top plate 34 are fitted with the through holes 108 and 109 of the bottom plate 36, respectively. Further, the upper surface of the bottom plate 36 abuts against a lower surface 38B of the base plate 32 and the upper surfaces of the inner walls 80A and 80B of the top plate 34, and therefore, is fitted with and is held in a circumferential wall 42 (including a rear wall 44, a left wall 46 and a right wall 48) of the base plate 32 and the inner circumferential surface of an outer wall 70 of the top plate 34. Thus, the bottom plate 36 can be secured to a case 30 by appropriate securing devices such as an adhesive, ultrasonic welding or screwing.

Subsequently, although an explanation will be made on the function of the disk cartridge 10 in the second embodiment in which the guide grooves 146 and 148 and the reference holes 150 and 152 are formed at the lower surface, although a description relating to the same function as that in the first embodiment will be omitted. The disk cartridge 10 is loaded in an insertion port 200 of the drive device, and then, a first shutter member 110 and a second shutter member 120 are pivoted in the same manner as described above, to be inserted deeply to a predetermined position while an opening 14 is opened. At this time, a positioning member in the drive device, for example, cylindrical projections 204 (see FIGS. 13A and 13B) are inserted into the guide grooves 146 and 148, respectively.

As the disk cartridge 10 is further loaded in the drive device, the projections 204 slide relatively backward while being guided by the guide grooves 146 and 148, to thus abut against the rear inner wall face of the positioning reference holes 150 and 152, that is, the rear inner wall faces at the lower ends of the bosses 154 and 156, and then, the projections 204 project upward. Consequently, the projections 204 can be stably inserted into the reference holes 150 and 152, so that the disk cartridge 10 can be accurately positioned with respect to the drive device.

Here, since the reference hole 152 is formed into substantially a slot-like shape shorter in the direction in which the disk cartridge 10 is loaded in the drive device, in other words, longer in the direction perpendicular to the direction in which the disk cartridge 10 is loaded in the drive device, the slot can compensate for the error even if there occurs a slight dimensional error at a position in the lateral direction between the positioning member in the drive device and the disk cartridge 10. Therefore, it is preferable that the reference hole 152 is formed into a substantially slot-like shape, and thus, the positioning members in the drive device can be securely inserted into the reference holes 150 and 152, respectively, with ease.

At the same time, the disk cartridge 10 is positioned in the vertical (i.e., height) direction with respect to the drive device in reference to reference surfaces 151 and 153. Here, the reference surfaces 151 and 153 are disposed such that the lower surfaces of the bosses 154 and 156 disposed on the top plate 34 having rigidity are exposed to the bottom plate 36, thereby achieving high molding accuracy. A recording side (i.e., a lower side) 24 of the disk medium 20 and a recording/reproducing head can be positioned in the height direction with high accuracy. As a consequence, the disk cartridge 10 can be positioned in the longitudinal, lateral and vertical (i.e., height) directions with respect to the drive device with high accuracy.

In this manner, the disk cartridge 10 can be positioned with high accuracy via the projections 204, and further, the disk cartridge 10 can be prevented from being inserted farther. Moreover, it is possible to inhibit the opening 14 from being shut by the urging force of a torsion spring 124 or the disk cartridge 10 from being moved in a discharging direction. Thereafter, information is recorded on the recording side of the disk medium 20 or the information recorded on the recording side is reproduced by a rotary spindle and the recording/reproducing head. When the disk cartridge 10 is discharged from the drive device, the projections 204 are withdrawn from the reference holes 150 and 152, respectively, and thus, the disk cartridge 10 can be discharged in the same manner as in the first embodiment.

The guide grooves 146 and 148 are formed by cutting away the bottom plate 36 with high moldability. The formation of the guide grooves 146 and 148 enables the projecting height of the positioning members (i.e., the projections) 204 to be compensate for the depth of the guide grooves 146 and 148. As a result, the insertion port 200 formed at the drive device, into which the disk cartridge 10 is inserted, can be reduced in thickness.

As described above, the guide grooves 146 and 148 are provided substantially in parallel to the direction in which the disk cartridge 10 is loaded in the drive device from the front end 10A of the disk cartridge 10 and the formation of the positioning reference holes 150 and 152 communicating with the guide grooves 146 and 148, respectively, enable the disk cartridge 10 to engage with the guide grooves 146 and 148, to be favorably guided with secureness by the positioning members (i.e., the projections) 204 in the drive device, which are inserted into the reference holes 150 and 152.

Additionally, the reference holes 150 and 152 and the reference surfaces 151 and 153 are provided at the bosses 154 and 156 disposed at the top plate 34 having rigidity, thereby achieving the reference holes and the reference surfaces having high accuracy. Therefore, it is possible to provide the disk cartridge 10 having remarkably high positioning accuracy with respect to the drive device. Incidentally, the shape of each of the bosses 154 and 156 is not limited to the cylindrical shape or a substantially elliptically cylindrical shape, as shown in the drawings. The bosses 154 and 156 may be formed into a prismatic shape or a polygonal shape which is shorter in the direction in which the disk cartridge 10 is loaded in the drive device.

Figure 14:
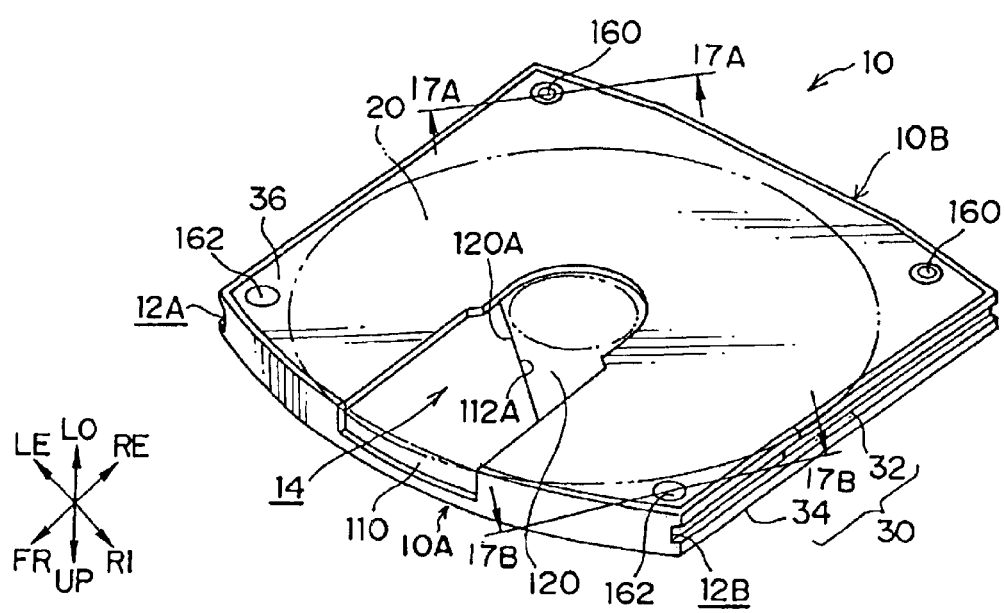
FIG. 14 is a perspective view showing a disk cartridge according to a third embodiment of the present invention, as viewed slantwise from a lower front side.

Next, a third embodiment according to the present invention will be described in reference to FIGS. 14 to 17B. As shown in FIG. 14, two reference holes 160 for restricting (detecting) the position of a disk cartridge 10 in the drive device are formed symmetrically with each other in the vicinity of a rear end 10B at the lower surface of the disk cartridge 10. Furthermore, two reference surfaces 162 to be used as dimensional references in a height direction of the disk cartridge 10 are formed symmetrically with each other in the vicinity of a front end 10A.

Figure 15:
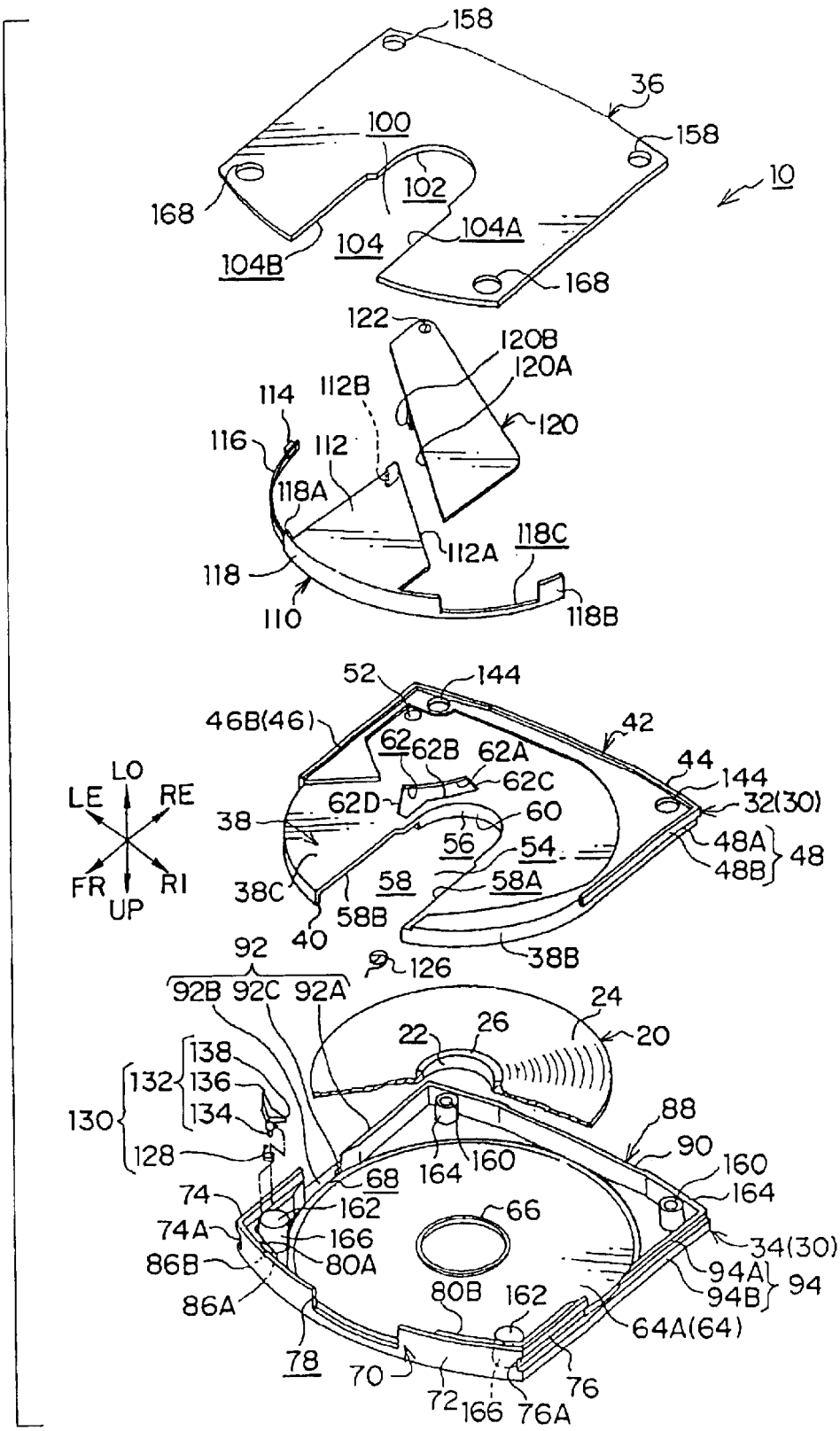
FIG. 15 is an exploded perspective view showing the disk cartridge in the third embodiment according to the present invention, as viewed slantwise from below.
Figure 16:
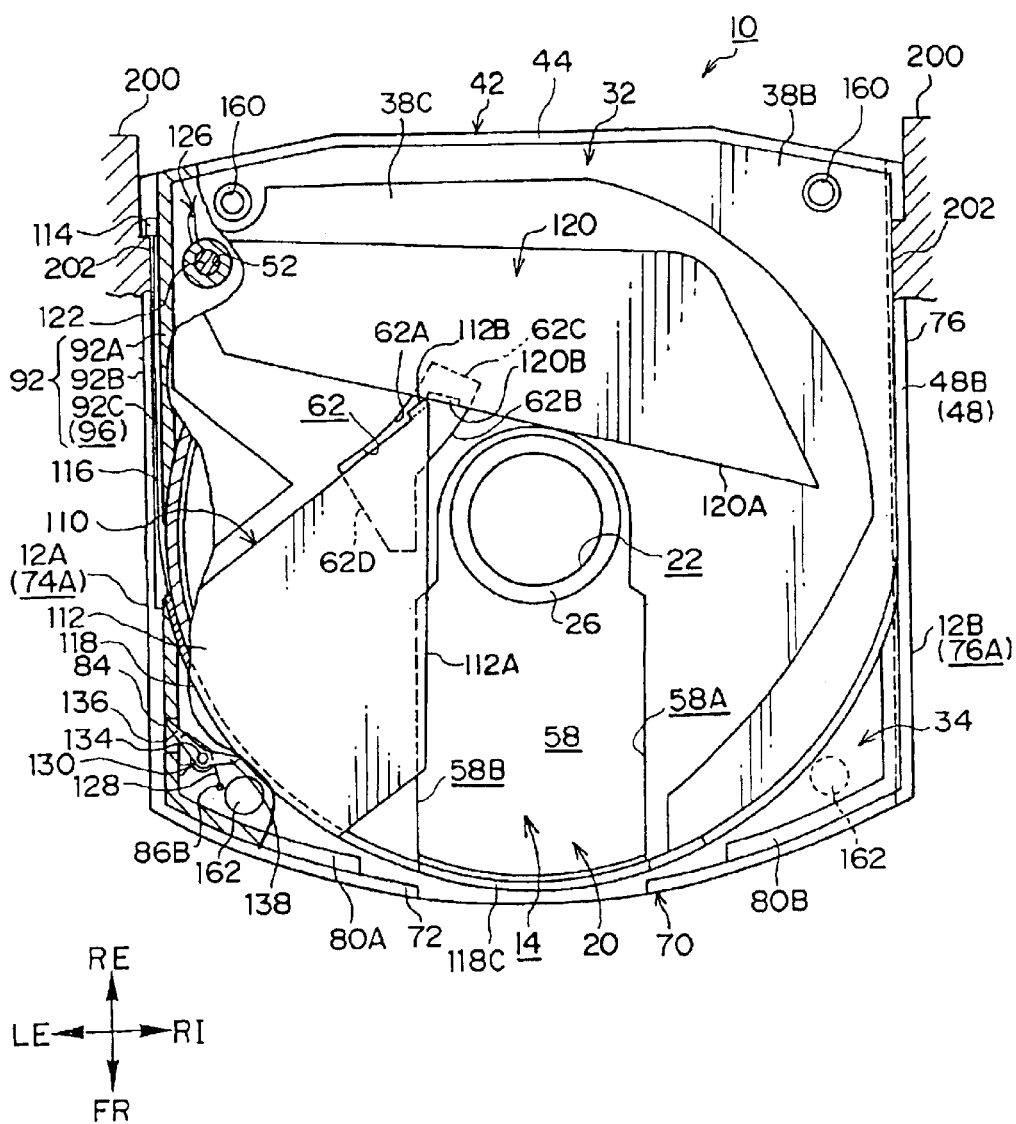
FIG. 16 is a bottom view showing, partly cut out, the entire configuration of the disk cartridge according to the third embodiment of the present invention in an opening opened state, in which a bottom plate is detached.
Figure 17A:
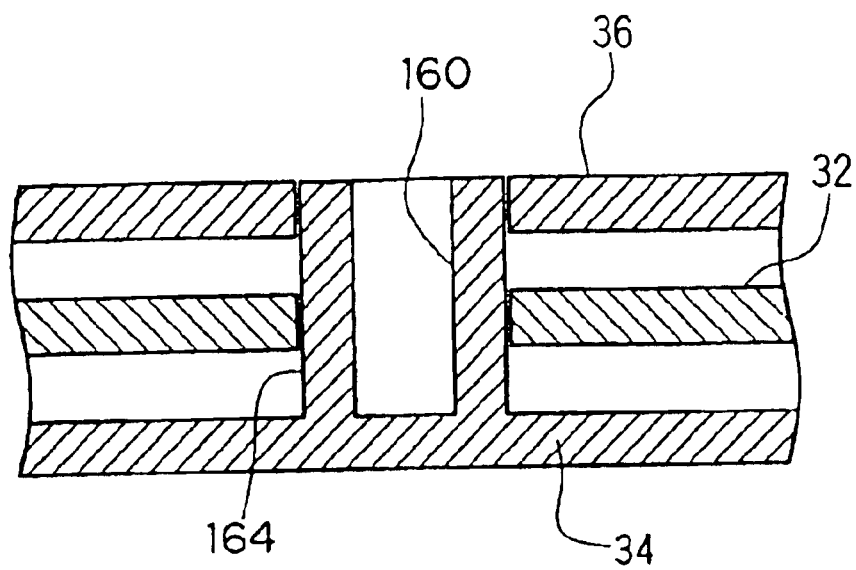
FIG. 17A is a cross-sectional view taken along a line 17A—17A of FIG. 14.
Figure 17B:
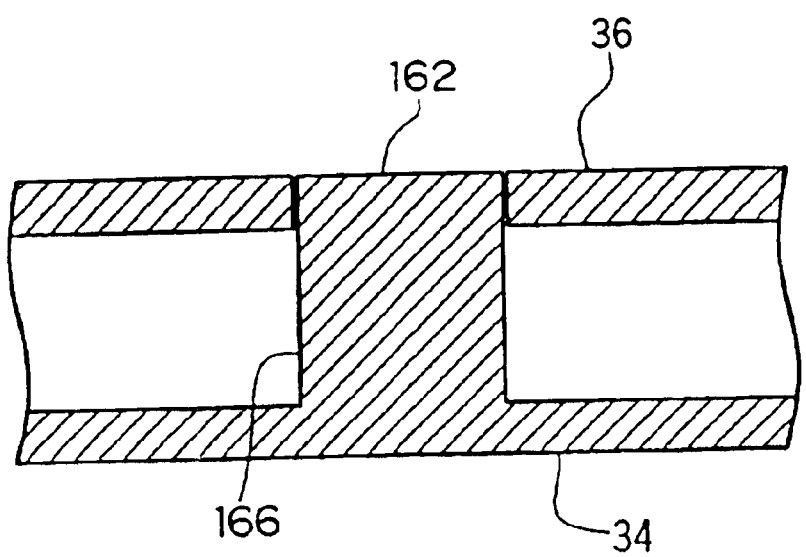
FIG. 17B is a cross-sectional view taken along a line 17B—17B of FIG. 14.

That is to say, as shown in FIGS. 15 and 16, through holes 144 are formed at both corners at a rear end of a base bottom 38 defined by a cylindrical wall 40 and a circumferential wall 42. Moreover, cylindrical bosses 164, each having a predetermined height, are formed at positions respectively corresponding to the through holes 144 between a circumferential wall 88 and an annular groove 68 at the lower surface 64A of a flat plate 64. A bottomed cylindrical hole is provided at the center protion of the boss 164, and thus, serves as the reference hole 160 for restricting the position of the disk cartridge 10 with respect to the drive device.

Right and left cylindrical bosses 166, each having a predetermined height, are provided also at predetermined positions between an inner wall 80A and the annular groove 68 and between an inner wall 80B and the annular groove 68, respectively. The lower surface of the boss 166 serves as the reference surface 162 which is used as the dimensional reference in a height direction of the disk cartridge 10. Here, a hole may be bored at the boss 166, to be used as the reference hole 160, and further, the lower surface of the boss 164 may be used as the reference surface 162. Through holes 158, each of which conforms to the outer diameter of the boss 164, and through holes 168, each of which conforms to the outer diameter of the boss 166, are provided at positions corresponding to the bosses 164 and 166, respectively, on a bottom plate 36.

Consequently, the bosses 164 disposed at a top plate 34 are fitted in the through holes 158 formed at the bottom plate 36 through the through holes 144 formed at a base plate 32, respectively, and, the bosses 166 disposed at the top plate 34 are fitted in the through holes 168 formed at the bottom plate 36, respectively. Further, the upper surface of the bottom plate 36 abuts against a lower surface 38B of the base plate 32 and the upper surfaces of the inner walls 80A and 80B of the top plate 34. Moreover, the base plate 32 and the bottom plate 36 are integrally secured to the top plate 34 by appropriate securing devices such as an adhesive, ultrasonic welding or screwing while the outer peripheral surface of the bottom plate 36 fits with and is held on the circumferential wall 42 (including of a rear wall 44, a left wall 46 and a right wall 48) of the base plate 32 and at the inner circumferential surface of an outer wall 70 of the top plate 34.

In this manner, the base plate 32 is already substantially positioned and assembled with respect to the top plate 34 by the bosses 164 respectively passing through the through holes 144, thereby enhancing the assembling accuracy and assembling properties of the disk cartridge 10. Thus, it is possible to improve the dimensional accuracy of the entire disk cartridge 10.

Subsequently, although an explanation will be made on the function in the third embodiment, a description relating to the same function as that in the first embodiment will be omitted below. When the disk cartridge 10 is loaded into an insertion port 200 of the drive device, first, the disk cartridge 10 is accurately positioned in the height direction thereof with respect to the drive device by the effect of the reference surfaces 162. Furthermore, when the disk cartridge 10 is inserted to a predetermined position, positioning members formed at the drive device, for example, cylindrical projections 204 (see FIGS. 13A and 13B) are inserted into the reference holes 160 for restricting a position, respectively.

In this manner, the disk cartridge 10 can be inhibited from being further inserted, and moreover, an opening 14 is inhibited from being closed by the urging force of a torsion spring 124 or the disk cartridge 10 from being moved in a discharging direction. Thus, the disk cartridge 10 can be accurately positioned in the longitudinal and lateral directions with respect to the drive device. It is understood that information can be thereafter recorded on a recording side of a disk medium 20 or the information recorded on the recording side can be reproduced by a rotary spindle and a recording/reproducing head. Incidentally, needless to say, when the disk cartridge 10 is discharged from the drive device, the positioning members (i.e., the projections 204 or the like) are withdrawn from the reference holes 160, and thus, the disk cartridge 10 can be discharged in the same manner as in the first embodiment.

As described above, in any case, the reference holes 160 for restricting the position at which the disk cartridge 10 is loaded in the drive device are provided at the bosses 164 disposed at the top plate 34, so that the disk cartridge 10 can be positioned with respect to the drive device with remarkably high accuracy. Moreover, the lower surfaces of the bosses 166 provided at the top plate 34 function as the reference surfaces 162 to be used as the dimensional reference in the height (thickness) direction of the disk cartridge 10, thus enhancing the dimensional accuracy in the height (thickness) direction.

In other words, since the top plate 34 has rigidity since no opening 14 is provided thereon, it can be molded with high accuracy, thereby enhancing the machining accuracy of the bosses 164 and 166 provided at the top plate 34. Therefore, it is possible to provide the reference holes 160 and the reference surfaces 162 with high accuracy. Consequently, it is possible to provide the disk cartridge 10 with remarkably high accuracy. Incidentally, although in the above-described embodiment, the bosses 164 and 166 are formed into a cylindrical shape, the shape is not limited to this. The bosses may be formed into a prismatic shape or the like, as long as reference holes and reference surfaces can be formed thereon. Additionally, it is preferable that the bosses having the reference holes or the bosses having the reference surfaces should be disposed right and left at least in pair at the front or rear portion, as shown in the drawings.

Figure 18:
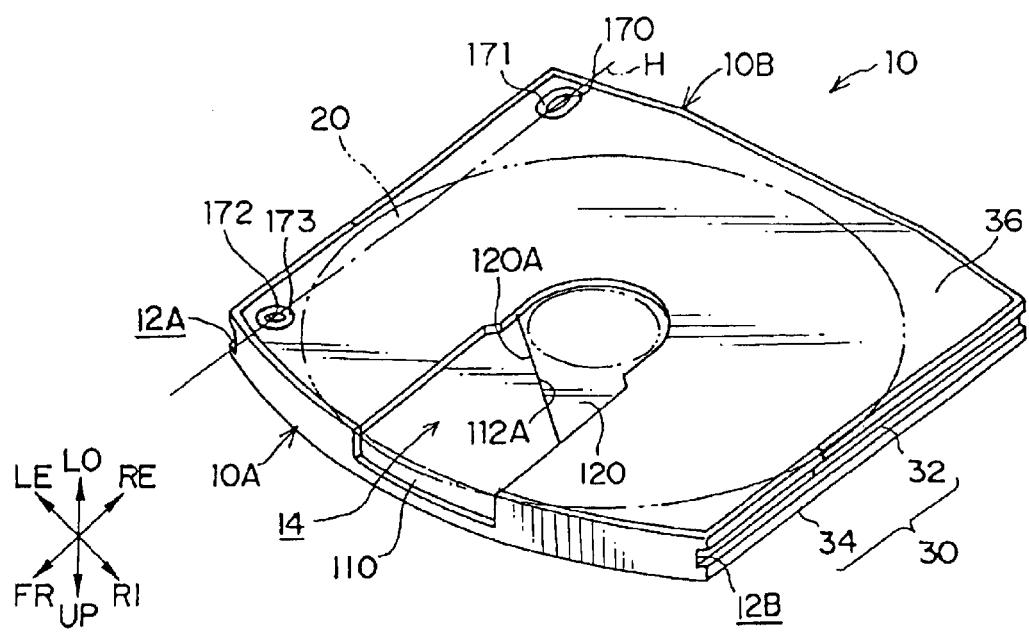
FIG. 18 is a perspective view showing a disk cartridge according to a fourth embodiment of the present invention, as viewed slantwise from a lower front side.

Next, a fourth embodiment according to the present invention will be described in reference to FIGS. 18 to 20. As shown in FIG. 18, reference holes 172 and 170 for positioning (i.e., detecting) a disk cartridge 10 in a drive device are provided near a front end 10A and a rear end 10B, respectively, and at the lower surface of the disk cartridge 10 in the vicinity of a first guide groove 12A at which an unlock lever 136 and a shutter engaging portion 114 are disposed. The reference hole 172 provided near the front end 10A is formed into a circular shape, and the reference hole 170 provided near the rear end 10B is formed into substantially a slot-like shape which has a major axis in a direction in which the disk cartridge 10 is loaded in the drive device.

Figure 19:
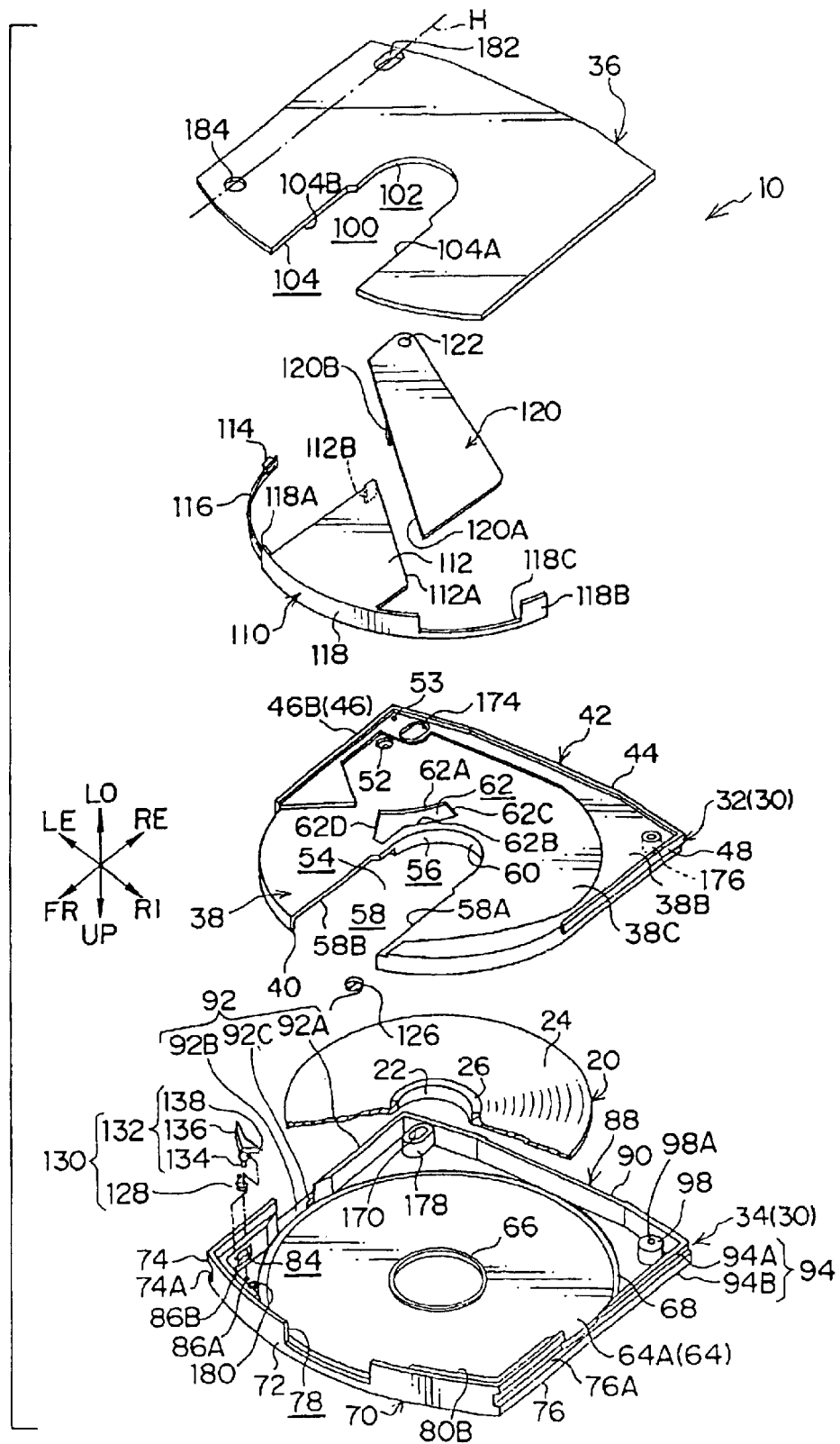
FIG. 19 is an exploded perspective view showing the disk cartridge according to the fourth embodiment of the present invention, as viewed slantwise from below.
Figure 20:
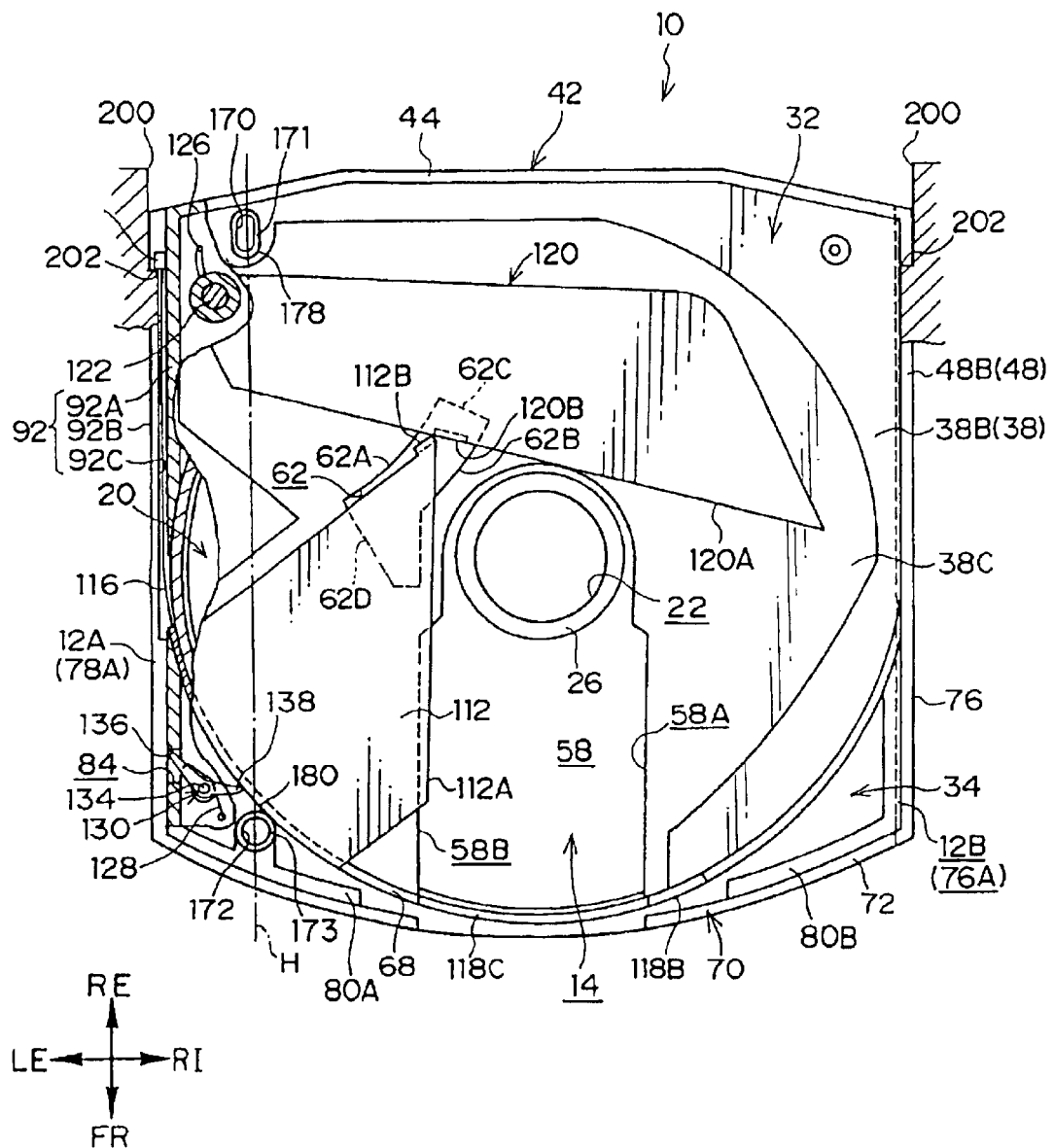
FIG. 20 is a bottom view showing, partly cut out, the entire configuration of the disk cartridge according to the fourth embodiment of the present invention in an opening opened state, in which a bottom plate is detached.

That is to say, as shown in FIG. 19, a through hole 174 formed into substantially a slot-like shape which has a major axis in the direction in which the disk cartridge 10 is loaded in the drive device is provided at a rear left corner of a base plate 32 between a cylindrical wall 40 and a circumferential wall 42, and further, a cylindrical projection 176 is provided at an upper surface 38A at a rear right corner. Moreover, a boss 178 formed into substantially an elliptically cylindrical shape and having a major axis in the direction in which the disk cartridge 10 is loaded in the drive device is provided at a position corresponding to the through hole 174 formed at the base plate 32 between a circumferential wall 88 and an annular groove 68 at a lower surface 64A of a flat plate 64. Additionally, a cylindrical boss 180 is provided integrally with an inner wall 80A between the inner wall 80A and the annular groove 68. Incidentally, the boss 180 may be provided independently of the inner wall 80A.

Bottomed holes having substantially an elliptically cylindrical shape and a cylindrical shape, respectively, are bored at the center portions of the bosses 178 and 180, respectively, and thus, serve as the reference holes 170 and 172 for positioning the disk cartridge 10 with respect to the drive device in the longitudinal and lateral directions. Moreover, the respective ring-like lower surfaces of the bosses 178 and 180 function as reference surfaces 171 and 173 for positioning the disk cartridge 10 in the vertical (i.e., height) direction. As shown in FIG. 20, the bosses 178 and 180 are aligned on a phantom line H parallel to the direction in which the disk cartridge 10 is loaded in the drive device, in plane view.

Additionally, a through hole 182 having substantially an elongated shape in conformity with the outer diameter of the boss 178 and a circular through hole 184 in conformity with the outer diameter of the boss 180 are provided at positions corresponding to the bosses 178 and 180 on a bottom plate 36, respectively. These through holes 182 and 184 also are aligned on the phantom line H parallel to the direction in which the disk cartridge 10 is loaded in the drive device, in plane view, as shown in FIG. 19.

As a consequence, the boss 178 disposed at a top plate 34 fits with the through hole 182 formed at the bottom plate 36 through the through hole 174 formed at the base plate 32 and, the boss 180 fits with the through hole 184 formed at the bottom plate 36. Further, the upper surface of the bottom plate 36 abuts against a lower surface 38B of the base plate 32 and the upper surfaces of the inner walls 80A and 80B of the top plate 34. In addition, the base plate 32 and the bottom plate 36 are integrally secured to the top plate 34 by appropriate securing devices such as an adhesive, ultrasonic welding or screwing in the state in which the outer peripheral surface of the bottom plate 36 is fitted with and is held on the circumferential wall 42 (including of a rear wall 44, a left wall 46 and a right wall 48) of the base plate 32 and the inner circumferential surface of an outer wall 70 of the top plate 34.

In this manner, the base plate 32 is already substantially positioned and assembled with respect to the top plate 34 by the effect of the boss 174 passing through the through hole 174, thereby enhancing the assembling accuracy and assembling properties of the disk cartridge 10. Thus, it is possible to improve the dimensional accuracy of the entire disk cartridge 10.

Subsequently, although an explanation will be made on the function in the fourth embodiment, although a description relating to the same function as that in the first embodiment will be omitted below. When the disk cartridge 10 is loaded into an insertion port 200 of the drive device, first, a positioning member of the drive device, which is exemplified by a cylindrical projection 204 (see FIGS. 13A and 13B) in this case since the reference hole 172 is circular, is inserted into the reference hole 172 disposed at the front end 10A in the vicinity of the first guide groove 12A. As the disk cartridge 10 is loaded in the drive device, the positioning member (i.e., the projection 204 or the like) is moved in the loading direction. Therefore, it is possible to position the first guide groove 12A with respect to a guide projection 202 with remarkably high accuracy.

In other words, since the guide projection 202 and the first guide groove 12A are moved in the state positioned by the positioning member (i.e., the projection 204), the guide projection 202 can securely abut against the unlock lever 136 and can certainly engage with the shutter engaging portion 114. Thereafter, when the positioning member (i.e., the projection 204 or the like) inserted into the reference hole 172 stops at a predetermined position upon complete loading of the disk cartridge 10, another positioning member, not shown, of the drive device is inserted into the reference hole 170.

At this time, the reference holes 170 and 172 are aligned on the phantom line H parallel to the direction in which the disk cartridge 10 is loaded in the drive device, so that the disk cartridge 10 can be positioned with high accuracy in the longitudinal and lateral directions with respect to the drive device. Furthermore, since the rear reference hole 170 is formed into substantially the slot-like shape and has the major axis in the direction in which the disk cartridge 10 is loaded in the drive device, the positioning member (not shown) can be securely inserted into the reference hole 170 with ease even if there occurs a slight dimensional error in the longitudinal direction between the positioning member in the drive device and the disk cartridge 10 when the disk cartridge 10 is loaded in the drive device.

Additionally, the disk cartridge 10 is positioned with respect to the drive device in the vertical (height) direction in reference to the reference surfaces 171 and 173. Here, the reference surfaces 171 and 173 are disposed such that the lower surfaces of the bosses 178 and 180 disposed at the top plate 34 having rigidity are exposed to the bottom plate 36, thereby achieving high molding accuracy. A recording side (i.e., a lower side) 24 of a disk medium 20 and a recording/reproducing head can be positioned in the height direction with high accuracy. As a consequence, the disk cartridge 10 can be relatively positioned with respect to a rotary spindle or the recording/reproducing head with high accuracy.

Needless to say, after the disk cartridge 10 is positioned in the above-described manner, information is recorded on the recording side of the disk medium 20 or the information recorded on the recording side is reproduced by the rotary spindle and the recording/reproducing head. Further, when the disk cartridge 10 is discharged from the drive device, the rear positioning member is withdrawn from the reference hole 170 while the front positioning member (i.e., the projection 204 or the like) is moved rearward in the state inserted into the reference hole 172, and then, is withdrawn.

As described above, the positioning reference holes 170 and 172 when the disk cartridge 10 is loaded in the drive device are aligned on the phantom line H parallel to the direction in which the disk cartridge 10 is loaded in the drive device. Thus, it is possible to enhance the positional accuracy of the disk cartridge 10 with respect to the drive device in mainly the longitudinal and lateral directions. Furthermore, particularly the reference holes 170 and 172 are formed in the vicinity of the first guide groove 12A in which the unlock lever 136 or the shutter engaging portion 114 are disposed, thereby securing the positional accuracy between the guide projection 202 and the first guide groove 12A, that is, between the guide projection 202 and the unlock lever 136 and between the guide projection 202 and the shutter engaging portion 114 in the drive device at a high level. Thus, it is possible to prevent any occurrence of a trouble that the opening 14 cannot be opened or the like.

Additionally, since the bosses 178 and 180 having the reference holes 170 and 172 formed thereat are disposed at the top plate 34, the lower surfaces of the bosses 178 and 180 are used as the reference surfaces 171 and 173 in the vertical (height) direction, respectively, thereby enhancing the positional accuracy of the disk cartridge 10 in the vertical (height) direction. In other words, since the top plate 34 has rigidity and is molded with high accuracy, the bosses 178 and 180 disposed at the top plate 34 can be machined with high accuracy. Therefore, it is possible to provide the reference holes and the reference surfaces with high accuracy. Consequently, it is possible to provide the disk cartridge 10 with respect to the drive device with remarkably high accuracy. Incidentally, although the bosses 178 and 180 are not limited to a cylindrical shape or substantially an elliptically cylindrical shape, as shown in the drawings, the bosses may be formed into a prismatic shape or a polygonal shape which is long in the direction in which the disk cartridge 10 is loaded in the drive device.

In any case, in the above-described embodiments, the disk medium 20 is of a type in which the information is recorded on only one side and the opening 14 is formed at the lower portion (inclusive of the front portion). However, the present invention is not limited to the above-described embodiments. For example, the disk medium 20 may be of a type in which the information is recorded on both sides and another opening 14 may be provided also at the upper portion. In this case, shutter members may be disposed for opening/closing the upper and lower openings, respectively. Moreover, the opening 14 is not limited to the configuration in which the hub hole 56 is connected with the window 58 for the recording/reproducing head, and therefore, the hub hole 56 may be formed separately from the window 58.

As described above, according to the present invention, it is possible to enhance the positional accuracy (i.e., the dimensional accuracy) of the disk cartridge with respect to the drive device in the longitudinal, lateral and vertical (height) directions. As a result, the center core of the disk medium can be accurately positioned all the time with respect to the rotary spindle in the drive device. Furthermore, it is possible to enhance the positional accuracy of the actuating member for opening/closing the shutter member with respect to the unlock member provided in the drive device. Thus, the actuating member can be prevented from accidentally slipping off from the unlock member, so as to prevent any occurrence of the trouble that the opening cannot be opened.

What is claimed is:

1. A disk cartridge for accommodating a disk medium and which is loaded into a drive device that accesses the disk medium to record or reproduce information thereon, the disk cartridge comprising:
   a case for rotatably accommodating the disk medium, the case including an arcuate side wall that is initially inserted into the drive device and having an opening in at least one surface thereof to enable access of the disk medium;
   an engaging portion for engaging with a sensor member of the drive device, the engaging portion being disposed at the arcuate side wall, wherein the engaging portion comprises a recessed notch that continues from an upper part of the side wall to an upper surface of the case; and
   a shutter member for opening the opening when the disk cartridge is inserted and for closing the opening when the disk cartridge is removed from the drive device.

2. The disk cartridge of claim 1, further comprising a covering-plate including an opening corresponding to the opening of the case, wherein the case comprises an upper shell and a lower shell joined to one another, with the opening of the case being formed in the lower shell, the shutter member is movably accommodated between the covering-plate and the lower shell, and the engaging portion is disposed at the upper shell.

3. A disk cartridge for accommodating a disk medium and which is loaded into a drive device that accesses the disk medium to record or reproduce information thereon, the disk cartridge comprising:
   a case for rotatably accommodating the disk medium, the case including an arcuate side wall that is initially inserted into the drive device and an opening in at least one surface thereof to enable access of the disk medium;
   a positioning portion for engaging with a restricting member of the drive device to position the disk medium, the positioning portion being disposed at the arcuate side wall;
   an operating portion for engaging with a detection member of the drive device to initiate operation of a spindle of the drive device, the operating portion being disposed at the arcuate side wall;
   a shutter member for opening the opening when the disk cartridge is inserted and for closing the opening when the disk cartridge is removed from the drive device;
   a covering-plate including an opening corresponding to the opening of the case, wherein the case comprises an upper shell and a lower shell joined to one another, with the opening of the case being formed in the lower shell, the shutter member is movably accommodated between the covering-plate and the lower shell, and the operating portion and the positioning portion are disposed at the upper shell; and
   wherein the positioning portion comprises a recessed notch that continues from an upper part of the arcuate side wall to an upper surface of the case.

4. The disk cartridge of claim 3, wherein the operating portion comprises a recessed notch that continues from an upper part of the arcuate side wall to an upper surface of the case.

5. A disk cartridge for accommodating a disk medium and which is loaded into a drive device that accesses the disk medium to record or reproduce information thereon, the disk cartridge comprising:
   a case for rotatably accommodating the disk medium, the case including an arcuate side wall that is initially inserted into the drive device and an opening in at least one surface thereof to enable access of the disk medium;
   a plurality of reference portions for positioning the disk cartridge in the drive device, the plurality of reference portions being engageable with a positioning member of the drive device and arranged in a line substantially parallel to a direction in which the disk cartridge is inserted into the drive device and disposed on at least one surface of the case; and a shutter member for opening the opening when the disk cartridge is inserted and for closing the opening when the disk cartridge is removed from the drive device.

6. The disk cartridge of claim 5, wherein the reference portion includes a hole portion and the number of the reference portion is more than one, and at least one of the hole portions is formed into an elongated hole with a shorter dimension along the direction of insertion.

7. The disk cartridge of claim 6, further comprising a covering-plate including an opening corresponding to the opening of the case, wherein the case comprises an upper shell and a lower shell joined to one another, with the opening of the case being formed in the lower shell, the shutter member is movably accommodated between the covering-plate and the lower shell, and wherein the upper shell includes bosses protruding therefrom passing through the covering-plate, and the reference portions being disposed at the bosses.

8. A disk cartridge for accommodating a disk medium and which is loaded into a drive device that accesses the disk medium to record or reproduce information thereon, the disk cartridge comprising:

a case for rotatably accommodating the disk medium, the case including an arcuate side wall that is initially inserted into the drive device and an opening in at least one surface thereof to enable access the disk medium;

a guide groove disposed in a side wall of the case;

a shutter member for opening and closing the opening;

a lock member for locking and unlocking the shutter member;

an actuating member disposed movably along the guide groove, so as to selectively abut against the lock member when the disk cartridge is inserted and removed from the drive device for actuating the shutter member to open or close the opening; and a plurality of reference portions for positioning the disk cartridge in the drive device, the plurality of reference portions being arranged substantially parallel to the guide groove and disposed on at least one surface of the case in the vicinity of the guide groove.

9. The disk cartridge of claim 8, wherein the reference portion includes a hole portion and the number of the reference portion is more than one, and at least one of the hole portions of the reference portions is formed into an elongated hole with a shorter dimension along the direction of insertion.

10. The disk cartridge of claim 9, further comprising a covering-plate including an opening corresponding to the opening of the case, wherein the case comprises an upper shell and a lower shell joined to one another, with the opening of the case being formed in the lower shell, the shutter member is movably accommodated between the covering-plate and the lower shell, and wherein the upper shell includes bosses protruding therefrom passing through the covering-plate, and the reference portions being disposed at the bosses.

11. The disk cartridge of claim 10, wherein at least one of the bosses is formed to pass through the lower shell.

* * * * *